United States Patent
Uekita et al.

[11] Patent Number: 4,954,608
[45] Date of Patent: Sep. 4, 1990

[54] COPOLYMERIZED POLYAMIC ACID SALTS AND PROCESS OF PRODUCING THEM

[75] Inventors: Masakazu Uekita; Hiroshi Awaji, both of Hyogo, Japan

[73] Assignee: Kanegafuchi Kagaku Kogyo Kabushiki, Osaka, Japan

[21] Appl. No.: 55,973

[22] Filed: Jun. 1, 1987

[30] Foreign Application Priority Data

May 30, 1986 [JP] Japan ................................ 61-126575
Jun. 20, 1986 [JP] Japan ................................ 61-145718

[51] Int. Cl.$^5$ ...................... C08G 73/10; C08G 69/26; C08G 69/32
[52] U.S. Cl. ................................ 528/350; 528/172; 528/186; 528/188; 528/220; 528/229; 528/310; 528/339; 528/352; 528/353
[58] Field of Search ............... 528/353, 186, 188, 310, 528/339, 172, 220, 229, 352, 350

[56] References Cited

U.S. PATENT DOCUMENTS

| | | | |
|---|---|---|---|
| 4,376,195 | 3/1983 | Lee | 528/353 |
| 4,454,276 | 6/1984 | Uda et al. | 528/353 |
| 4,487,911 | 12/1984 | Lange et al. | 528/353 |
| 4,551,522 | 11/1985 | Fryd et al. | 528/353 |

*Primary Examiner*—John Knight, III
*Assistant Examiner*—P. Hampton-Hightower
*Attorney, Agent, or Firm*—Armstrong, Nikaido, Marmelstein, Kubovcik & Murray

[57] ABSTRACT

A copolymerized polyamic acid salt having a recurring unit represented by following formula (I) and (II) and the process for preparing thereof.

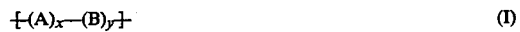

(I)

and

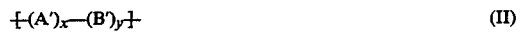 (II)

wherein (A) or (A') represents a formula

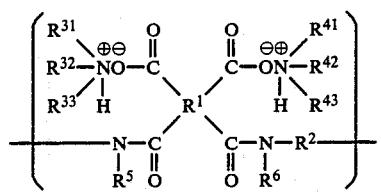 (1)

wherein, $R^1$ represents a tetravalent group having at least 2 carbon atoms; $R^2$ represents a divalent group having at least 2 carbon atoms; and $R^{31}$, $R_{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and (B) or (B') represents one or more formula

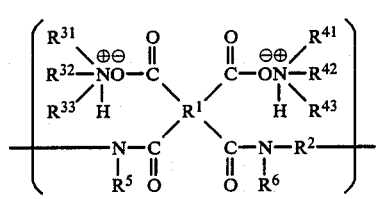 (1)

wherein $R^1$, $R^2$, $R^{31}$, $R^{32}$, $R^{33}$, $R^{41}$, $R^{42}$, $R^{43}$, $R^5$ and $R^6$ are defined in (A); and x and y represents a ratio which satisfies 0 x 1, 0 y 1 and x+y=1.

In formula (I) at least one of said $R^1$, $R^2$, $R^{31}$, $R^{32}$, $R^{33}$, $R^{41}$, $R^{42}$, $R^{43}$, $R^5$ and $R^6$ do not take the same group as defined in (A), and in formula (II) a part of at least one of $R^1$ and $R^2$ is substituted by a group having a different valence.

23 Claims, No Drawings

COPOLYMERIZED POLYAMIC ACID SALTS AND PROCESS OF PRODUCING THEM

FIELD OF THE INVENTION

This invention relates to an amphiphilic polyimide precursor and a process for the production thereof. More particularly, the invention relates to an amphiphilic polyimide precursor which is modified to be able to form thin film by a Langmuir-Blodgett method (hereinafter, is referred to as LB method) and a process for the production thereof.

BACKGROUND OF THE INVENTION

In 1930, it was found by Langmuire and Blodgett that a fatty acid having about 16 to 22 carbon atoms could form a monomolecular film on the surface of water and the film could be built up on a substrate but the application of the built-up film has recently begun to be investigated. However, a Langmuir-Blodgett film (hereinafter, is referred to as LB film) of a straight chain saturated fatty acid is insufficient in heat resistance and mechanical strength for practical application and such a LB film cannot be used for practical purpose as it is.

For overcoming these problems, a built-up film of a film formed from a saturated fatty acid such as ω-tricocenoic acid, ω-heptadecenoic acid, αoctadecylacrylic acid, etc., or an unsaturated fatty acid ester such as vinyl stearate, octadecyl acrylate, etc., has been investigated but such a film is yet insufficient in heat resistance, etc.

On the other hand, a polyimide film is known as a heat resisting film but in the case of forming the film thereof by spin coating, etc., which is known to be a coating method for forming the thinnest film of such a polymer, the thickness of the film formed is at best not thinner than 1000 Å and is usually thicker than about 1 μm. In other words, it is very difficult to form a heat resisting thin film of thinner than 1000 Å having no pin holes by using such a polymer.

SUMMARY OF THE INVENTION

The present invention has, therefore, been made for obtaining a LB film having improved properties such as heat resistance, adhesive strength, etc., and improved chemical resistance, etc., and the object of this invention is to provide materials which can be used for forming very thin films having high heat resistance.

It has now been discovered that a substituent for imparting hydrophobic property to a polyamic acid unit can be introduced into the polyamic acid unit and aforesaid object of this invention can be achieved by using the product obtained by introducing the substituent to the polyamic acid unit, and the invention has been attained based on the discovery.

That is, according to this invention, there is provided a copolymerized polyamic acid salt having a recurring unit represented by formula

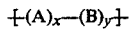   (I)

wherein (A) represents a formula

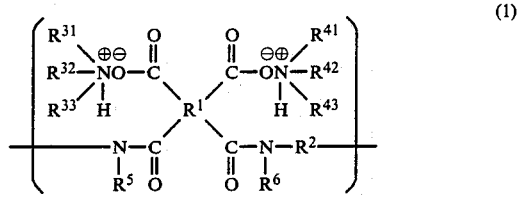

wherein, $R^1$ represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and (B) represents one or more formula

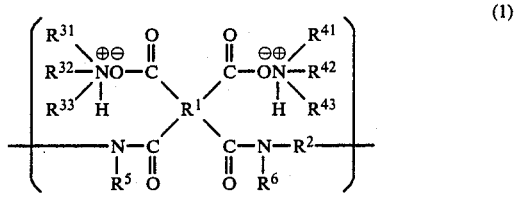

wherein $R^1$, $R^2$, $R^{31}$, $R^{32}$, $R^{33}$, $R^{41}$, $R^{42}$, $R^{43}$, $R^5$ and $R^6$ are as defined in (A) except that at least one of said $R^1$, $R^2$, $R^{31}$, $R^{32}$, $R^{33}$, $R^{41}$, $R^{42}$, $R^{43}$, $R^5$ and $R^6$ do not take the same group as defined in (A); and x and y represent a ratio which satisfies $0 < x < 1$, $0 < y < 1$ and $x + y = 1$.

According to the present invention, a copolymerized polyamic acid salt has a recurring unit represented by formula

   (II)

wherein (A') represents a formula

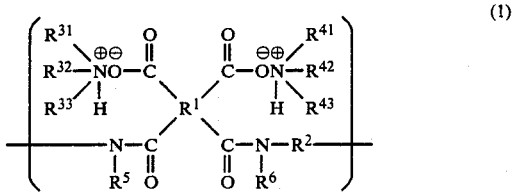

wherein, $R^1$ represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and (B') represents one or more formula

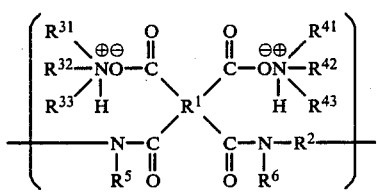
(1)

wherein R$^1$, R$^2$, R$^{31}$, R$^{32}$, R$^{33}$, R$^{41}$, R$^{42}$, R$^{43}$, R$^5$ and R$^6$ are as defined in (A); a part of at least one of R$^1$ and R$^2$ is substituted by a group having a different valence; x and y represent a ratio which satisfies $0<x<1$, $0<y<1$ and $x+y=1$.

According to other embodiment of this invention, there is provided a process of producing a copolymerized polyamic acid salt having a recurring unit represented by formula (1)

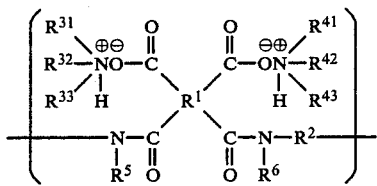
(1)

wherein, R$^1$ represents a tetravalent group having at least 2 carbon atoms; R$^2$ represents a divalent group having at least 2 carbon atoms; and R$^{31}$, R$^{32}$, R$^{33}$, R$^{41}$, R$^{42}$, R$^{43}$, R$^5$, and R$^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atoms; at least one of said R$^{31}$, R$^{32}$, R$^{33}$, R$^{41}$, R$^{42}$, R$^{43}$, R$^5$ and R$^6$ do not take a group having 1 to 11 carbon atoms or a hydrogen atom; and

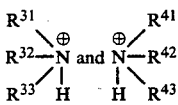

are selected to have a different structure which comprises reacting a tetracarboxylic acid dianhydride represented by formula (4)

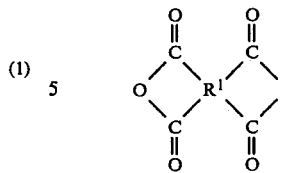
(4)

wherein, R$^1$ represents a tetravalent group having at least 2 carbon atoms and a compound represented by formula (6)

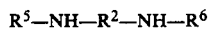

$$R^5-NH-R^2-NH-R^6 \qquad (6)$$

wherein, R$^2$ represents a divalent group having at least 2 carbon atoms and R$^5$ and R$^6$ each represents a monovalent group having 1 to 30 carbon selected from the group consisting of an aliphatic group, an alicyclic group, an aromatic group and a group in which an aliphatic group is combined with an alicyclic group or an aromatic group; each of these groups substituted by a halogen atom, a nitro group, an amino group, a cyano group, a methoxy group, or an acetoxy group, or a hydrogen atom; acetoxy group, or a hydrogen atom; to provide a polyamic acid having a recurring unit represented by formula

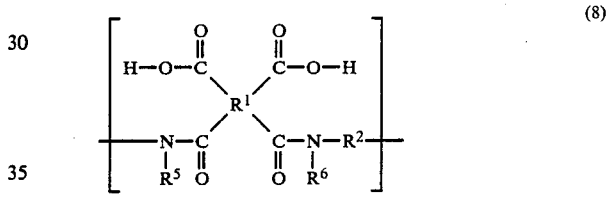
(8)

wherein, R$^1$, R$^2$, R$^5$, and R$^6$ are as defined above and reacting the polyamic acid thus obtained with

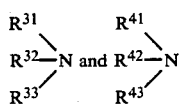

wherein, R$^{31}$, R$^{32}$, R$^{33}$, R$^{41}$, R$^{42}$, and R$^{43}$ are as defined above on R$^5$ and R$^6$; and

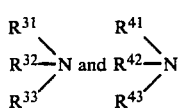

are selected to have a different structure.

Also, according to still other embodiment of this invention, there is further provided a process of producing a copolymerized polyamic acid salt having a recurring unit represented by formula

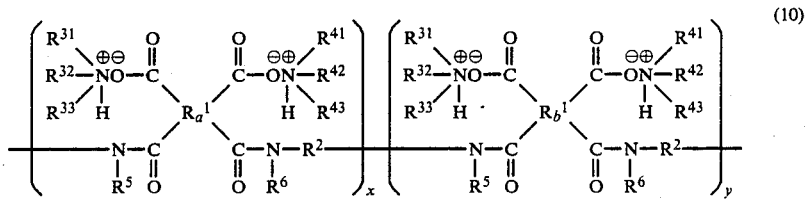
(10)

wherein, $R_a^1$ and $R_b^1$ each represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; which comprises reacting at least two kinds of tetracarboxylic acid dianhydride represented by formula

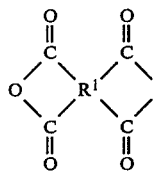

(4)

wherein, $R^1$ represents a tetravalent group having at least 2 carbon atoms and a compound represented by formula $$R^5-NH-R^2-NH-R^6 \qquad (6)$$

wherein, $R^2$, $R^5$ and $R^6$ are defined above, to provide a polyamic acid having a recurring unit represented by formula

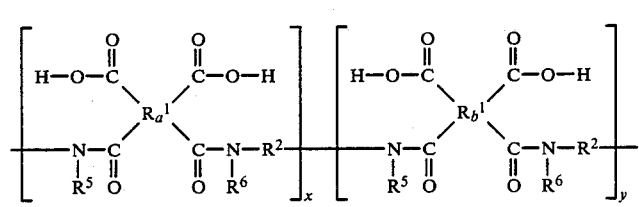

(9)

wherein, $R^2$, $R^5$, and $R^6$ are as defined above; $R^1$ and $R^1$ are as defined above on $R^1$; and x and y represent a ratio which satisfies $0 < x < 1$, $0 < y < 1$, and $x + y = 1$ and then reacting the polyamic acid thus obtained with

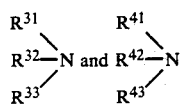

wherein, $R^{31}$, $R^{32}$, $R^{33}$, $R^{41}$, $R^{42}$, and $R^{43}$ and defined above on $R^5$ and $R^6$.

Moreover, according to another embodiment of this invention, there is provided a process of producing a copolymerized polyamic acid salt having recurring unit represented by formula (12)

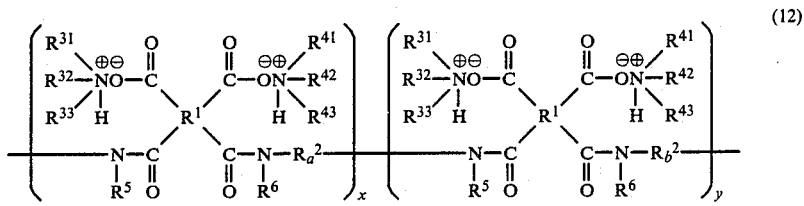

(12)

wherein, $R^1$ represents a tetravalent group having at least 2 carbon atoms; $R_a^2$ and $R_b^2$ each represents a divalent group having at least 2 carbon atoms; $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; which comprises reacting a tetracarboxylic acid di-anhydride represented by formula

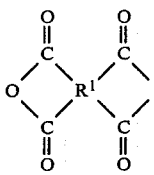

(4)

wherein, $R^1$ represents a tetravalent group having at least 2 carbon atoms and at least two kinds of compounds represented by formula $$R^5-NH-R^2-NH-R^6 \qquad (6)$$

wherein, $R^2$, $R^5$ and $R^6$ are as defined above to provide a polyamic acid having a recurring unit represented by formula

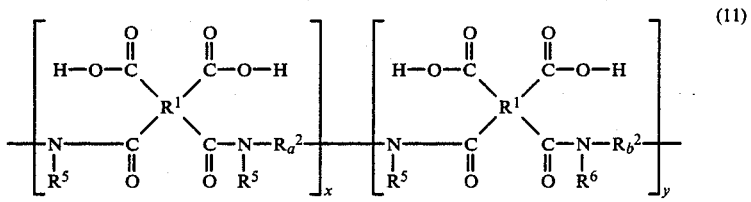
(11)

wherein, $R^1$, $R^5$, and $R^6$ are as defined above; $R_a^2$ and $R_b^2$ are as defined above on $R^2$; and x and y represent a ratio and $0<x<1$, $0<y<1$, and $x+y=1$ and then reacting the polyamic acid thus obtained with

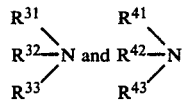

wherein, $R^{31}$, $R^{32}$, $R^{33}$, $R^{41}$, $R^{42}$, and $R^{43}$ are as defined above on $R^5$ and $R^6$.

According to further embodiment of this invention, there is provided a process of producing a copolymerized polyamic acid salt having a recurring unit represented by formula (102)

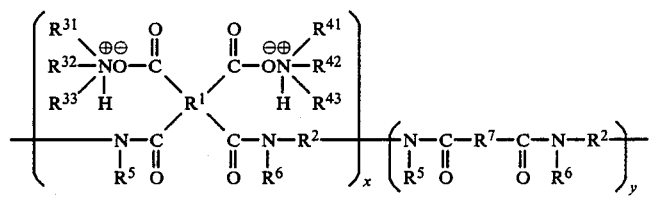

wherein, $R^1$ represents a tetravalent group having at least 2 carbon atoms; $R^2$ represents a divalent group having at least 2 carbon atoms; $R^7$ represents a divalent group having at least 2 carbon atoms; $R^{31}$, $R^{32}$, $R^{33}$, $R^{41}$, $R^{42}$, $R^{43}$, $R^5$, and $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one, and preferably at least two of said $R^{31}$, $R^{32}$, $R^{33}$, $R^{41}$, $R^{42}$, $R^{43}$, $R^5$, and $R^6$ do not take a group having 1 to 11 carbon atoms or a hydrogen atom; and x and y represent a ration and $0<x<1$, $0<y<1$, and $x+y=1$, which comprises reacting a tetracarboxylic acid dianhydride represented by formula

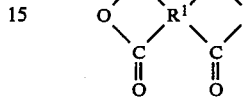
(4)

wherein, $R^1$ represents a tetravalent group having at least 2 carbon atoms, an acid halide formed in a substantially water free polar organic solvent from a compound represented by formula

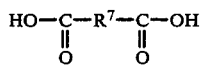
(16)

wherein, $R^7$ is as defined above, and a compound represented by formula $$R^5-NH-R^2-NH-R^6 \quad (6)$$

wherein, $R^2$, $R^5$ and $R^6$ are as defined above to provide a compound represented by the formula

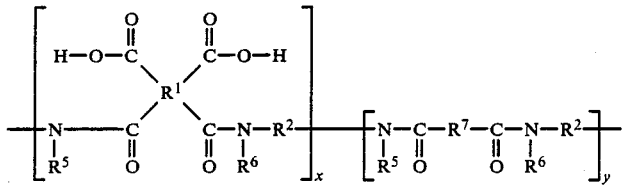

wherein, $R^1$, $R^2$, $R^5$, $R^6$, $R^7$, x and y are as defined above, and then reacting the compound thus obtained with

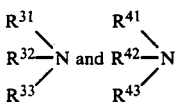

wherein, $R^{31}$, $R^{32}$, $R^{33}$, $R^{41}$, $R^{42}$, and $R^{43}$ are as defined above.

According to still further embodiment of this invention, there is provided a process of producing a copolymerized polyamic acid salt having a recurring unit represented by formula

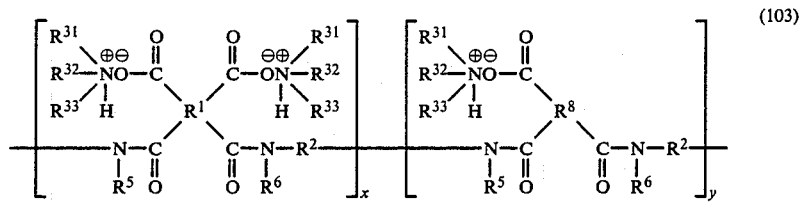 (13)

wherein, $R^1$ represents a tetravalent group having at least 2 carbon atoms; $R^2$ represents a divalent group having at least 2 carbon atoms; $R^8$ represents a trivalent group having at least 2 carbon atoms; $R^{31}$, $R^{32}$, $R^{33}$, $R^{41}$, $R^{42}$, $R^5$, and $R^6$ each represents a monovalent group having 1 to 30 carbon atoms selected from an aliphatic group, an alicyclic group, an aromatic group, a group in whcih an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and x and y represent a ratio which satisfies $0<x<1$, $0<y<1$ and $x+y=1$, which comprises reacting a tetracarboxylic acid dianhydride represented by formula

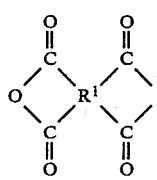 (4)

wherein, $R^1$ is same as defined above, an acid halide formed in a substantially water free polar organic solvent from a compound represented by formula

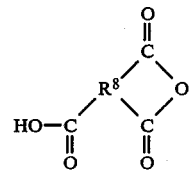

wherein, $R^8$ is as defined above, and a compound represented by formula $$R^5-NH-R^2-NH-R^6 \quad (6)$$

wherein, $R^2$, $R^5$, and $R^6$ are defined above to provide a compound represented by the following formula

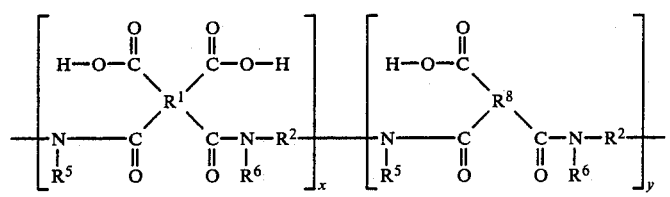

wherein, $R^1$, $R^2$, $R^5$, $R^6$, $R^8$, x and y are as defined above, and then reacting the compound thus obtained with

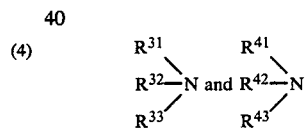

wherein, $R^{31}$, $R^{32}$, $R^{33}$, $R^{41}$, $R^{42}$, $R^{43}$, $R^5$, and $R^6$ are as defined above.

According to still other embodiment of this invention, there is provided a process of producing a copolymerized polyamic acid salt having a recurring unit represented by formula

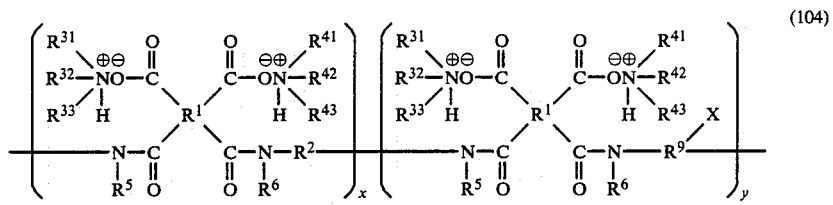 (104)

wherein, $R^1$ represents a tetravalent group having at least 2 carbon atoms; $R^2$ represents a divalent group having at least 2 carbon atoms; $R^9$ represents a trivalent group having at least 2 carbon atoms; $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetocy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; X represents a substituent for $R^9$, and x and y represent a ratio which satisfies 0x 1, 0y 1, and $x+y=1$, which comprises reacting a tetracarboxylic acid dianhydride represented by a formula

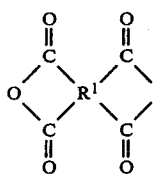 (4)

wherein, $R^1$ is as defined above, a compound represented by formula

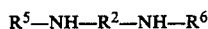 (6)

wherein, $R^2$, $R^5$, and $R^6$ are as defined above, and a compound represented by formula

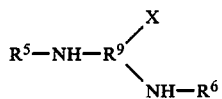 (14)

wherein, $R^5$, $R^6$ and $R^9$ and X are as defined above, to provide a compound represented by the formula

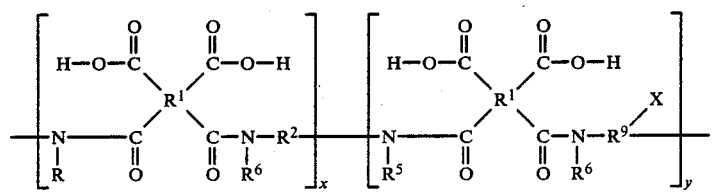

wherein, $R^1$, $R^2$, $R^5$, $R^6$, $R^9$, R, x and y are same as defined above and then reacting the compound thus obtained with

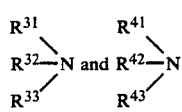

wherein, $R^{31}$, $R^{32}$, $R^{33}$, $R^{41}$, $R^{42}$, and $R^{43}$ are as defined above.

According to another embodiment of this invention, there is further provided a process of producing a copolymerized polyamic acid salt having a recurring unit represented by formula

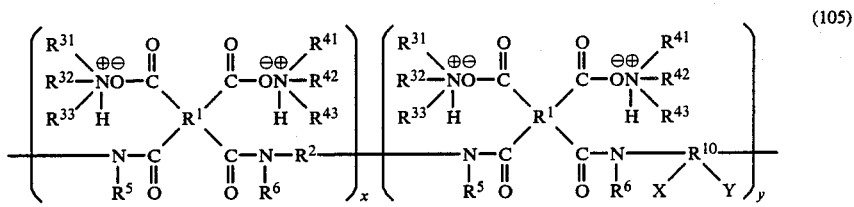 (105)

wherein, $R^1$ represents a tetravalent group having at least 2 carbon atoms; $R^2$ represents a divalent group having at least 2 carbon atoms; $R^{10}$ represents a tetravalent group having at least 2 carbon atoms; $R^{31}$, $R^{32}$, $R^{33}$, $R^{41}$, $R^{42}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; X and Y represent substituents for $R^{10}$; and x and y represent a ratio which satisfies $0<x<1$, $0<y<1$, and $x+y=1$, which comprises reacting a tetracarboxylic acid dianhydride represented by formula

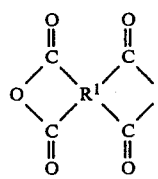 (4)

wherein, $R^1$ is as defined above, a compound represented by formula $R^5$—NH—$R^2$—NH—$R^6$ (6)

wherein, $R^2$, $R^5$, and $R^6$ are as defined above, and a compound represented by formula (15)

 (15)

wherein, $R^5$, $R^6$, X and Y are as defined above to provide a compound represented by the following formula

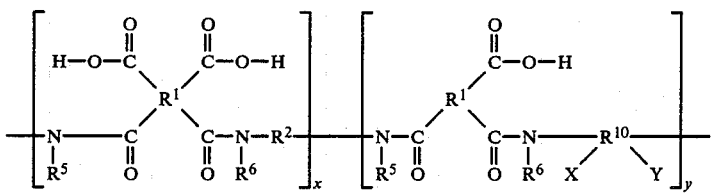

wherein, $R^1$, $R^2$, $R^5$, $R^6$, $R^{10}$, X, Y, x and y are as defined above, and then reacting the compound thus obtained with

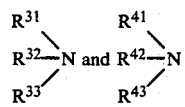

wherein, $R^{31}$, $R^{32}$, $R^{33}$, $R^{41}$, $R^{42}$, and $R^{43}$ are as defined above.

DETAILED DESCRIPTION OF THE INVENTION

The copolymerized polyamic acid salt of this invention has a recurring unit shown by following formula (1)

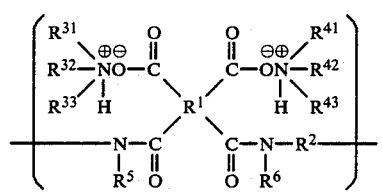
(1)

and has a number average molecular weight of from 2,000 to 300,000, and preferably from 10,000 to 150,000. If the number average molecular weight thereof is outside the range of from 2,000 to 300,000, there occur such tendencies that the strength of the film formed is too low or also a viscosity of the polymer is too high and accordingly, the procedure for forming LB films becomes difficult.

$R^1$ in formula (1) described above is a tetravalent group having at least 2 carbon atoms, preferably 5 to 20 carbon atoms. It may be an aromatic group; an alicyclic group; an aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as $R^1$ in points of heat resistance, chemical resistance and mechanical properties.

Specific examples of $R^1$ as described above are as follows:

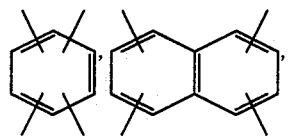

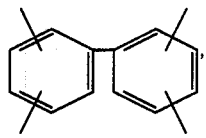

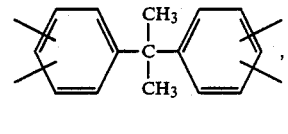

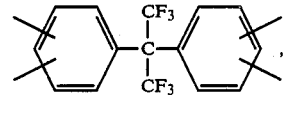

(n = 1~3),

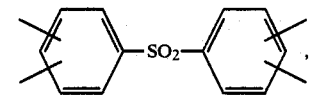

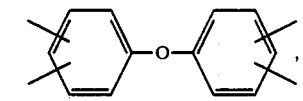

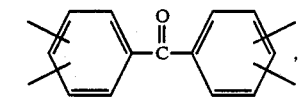

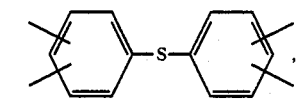

-continued

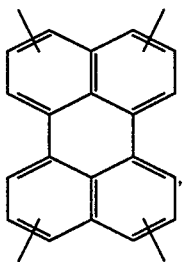

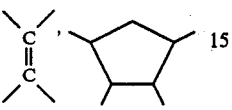

The term "benzenoid unsaturation" in this specification is a technical term which is used in contrast with a quinoid structure in regard to the structure of a carbon cyclic compound as shown below and means a structure same as the form of a carbon ring contained in an ordinary aromatic compound.

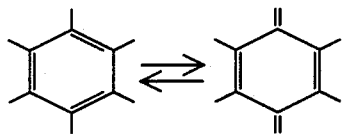

Quinoid Structure    Benzenoid Unsaturation

There is no particular restriction on the positions of the four bonds of $R^1$, that is, the positions of the bonds linking

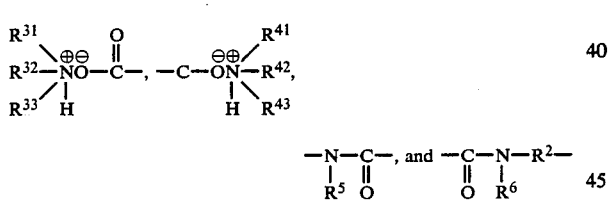

in the recuring unit shown by formula (1) described above. However, the case that each two of the four bonds exist at the adjoining 2 carbon atoms constituting $R^1$ is preferred since in the case of imidating a film formed by using an amphiphilic polyimide precursor, $R^1$ is liable to form a 5-membered ring and is liable to be imidated.

Preferred examples of $R^1$ as described above are as follows.

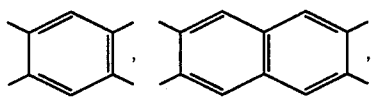

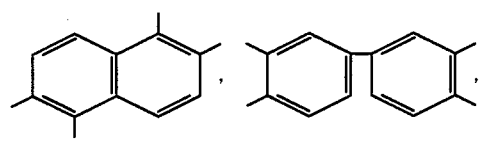

-continued

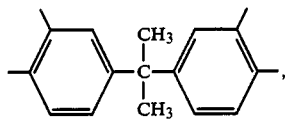

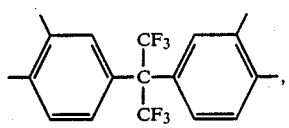

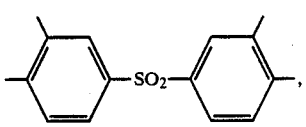

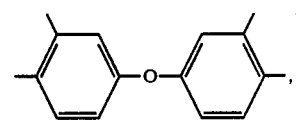

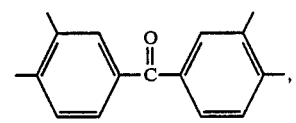

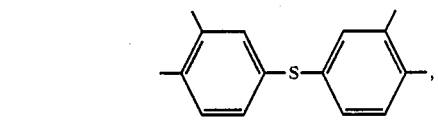

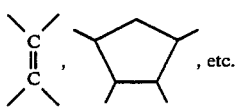

Also, the following group is preferred as $R^1$.

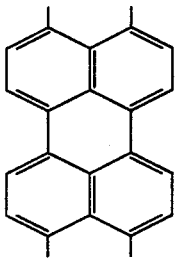

$R^2$ in formula (1) described above is a divalent group having at least 2 carbon atoms, which may be an aromatic group, an aliphatic group, alicyclic group, or a group formed by bonding of an aromatic group and an aliphatic group. Furthermore, the divalent group may be substituted by a monovalent group having 1 to 30 carbon atoms selected from the group consisting of an aliphatic group, an alicyclic group, an aromatic group and a group in which an aliphatic group is combined with an alicyclic group or an aromatic group. Still further, these substituents may be further substituted by a monovalent group such as a halogen atom, a nitro group, an amino group, a cyano group, a methoxy group, an acetoxy group, etc. Moreover, these monovalent groups may be further substituted by a group bonded to —O—, —COO—, —NHCO—, —CO—, —S—, —CSS—, —NHCS—, —CS—, etc.

It is, however, preferred from the points of heat resistance, chemical resistance, and mechanical properties that $R^2$ is a group characterized by a benzenoid unsaturation having 6 carbon atoms.

Specific examples of $R^2$ as described above are

[wherein, $R^{11}$ represents —$(CH_2)_m$— (wherein, m is an integer of 1 to 3),

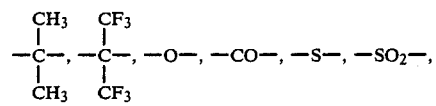

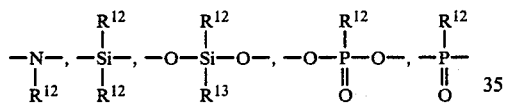

(wherein, $R^{12}$ and $R^{13}$ each represents an alkyl group having 1 to 30 carbon atoms or an aryl group)],

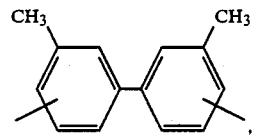

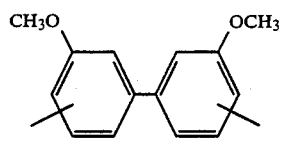

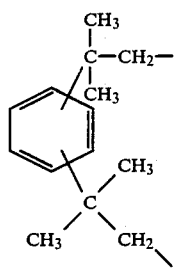

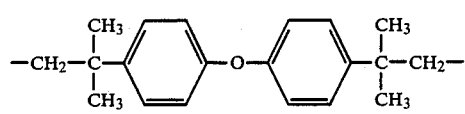

-continued

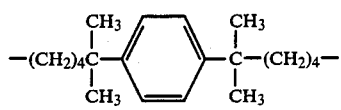

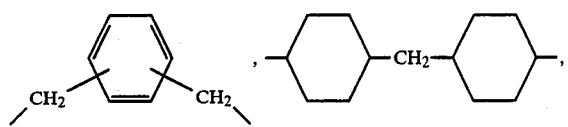

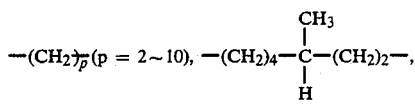

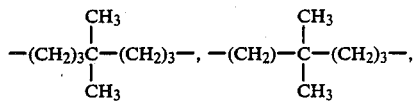

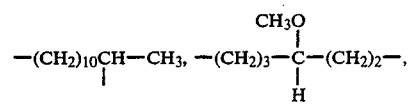

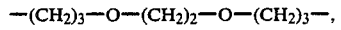

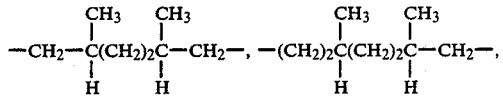

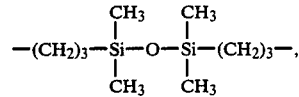

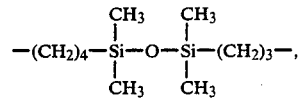

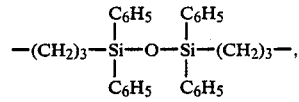

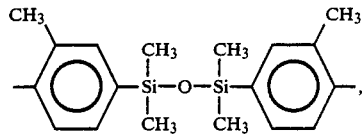

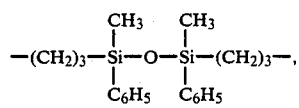

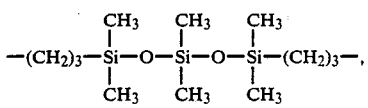

or

-continued

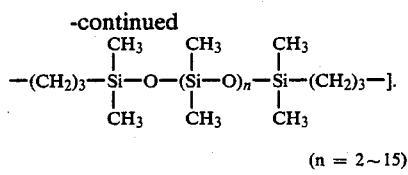

(n = 2~15)

Preferred examples of $R^2$ described above are

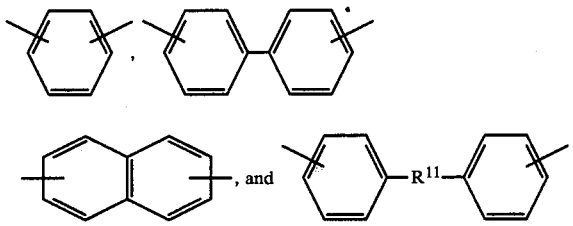, and wherein, $R^{11}$ represents $-(CH_2)_m$ (m is an integer of 1 to 3),

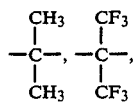

—O—, —CO—, —S—, —SO$_2$—, —NR$^{10}$—,

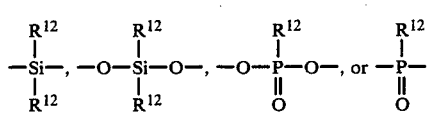

(wherein $R^{12}$ represents an alkyl group having 1 to 30 carbon atoms or an aryl group).

In formula (1) described above, $R^{31}$, $R^{32}$, $R^{33}$, $R^{41}$, $R^{42}$, $R^{43}$, $R^5$, and $R^6$ each represents a monovalent group having 1 to 30, preferably 1 to 22 carbon atoms selected from the group consisting of an aliphatic group, an alicyclic group, an aromatic group and a group in which an aliphatic group is combined with an alicyclic group or an aromatic group, which may be substituted by a halogen atom, a nitro group, an amino group, a cyano group, a methoxy group or an acetoxy group, or a hydrogen atom. In addition, $R^{31}$, $R^{32}$, $R^{33}$, $R^{41}$, $R^{42}$, $R^{43}$, $R^5$, and $R^6$ each is a group which is introduced for imparting hydrophobic property to a polyamic acid unit represented by formula (8)

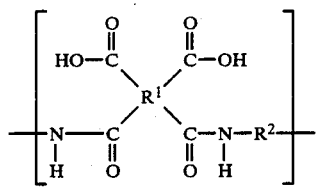

wherein, $R^1$ and $R^2$ have the same significance as defined above and obtaining a stable condensed film, and it is necessary for forming a stable condensed film on the surface of water and building-up the film on a substrate by an LB method that at least two of $R^{31}$, $R^{32}$, $R^{33}$, $R^{41}$, $R^{42}$, $R^{43}$, $R^5$ and $R^6$ are not simultaneously the aforesaid group having 1 to 11 carbon atoms, preferably 1 to 15 carbon atoms or a hydrogen atom. Also, in the case of selecting two groups from $R^{31}$, $R^{32}$, $R^{33}$, $R^{41}$, $R^{42}$, and $R^{43}$, it is desirable for the stability of the film on the surface of water that one of the groups is selected from $R^{31}$, $R^{32}$, and $R^{33}$ and the other from $R^{41}$, $R^{42}$, and $R^{43}$.

Specific examples of aforesaid $R^{31}$, $R^{32}$, $R^{33}$, $R^{41}$, $R^{42}$, $R^{43}$, $R^5$, and $R^6$ are, in addition to a hydrogen atom, as follows;

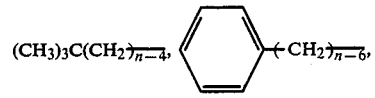

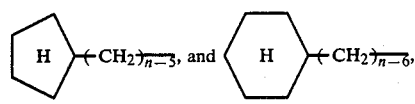

(wherein, n is from 12 to 30, preferably from 16 to 22).

In this case, for attaining the object of this invention, it is most desirable from the aspects of performance and cost to utilize a straight chain alkyl group shown by $CH_3(CH_2)_{\overline{n-1}}$.

Also, a halogen atom, a nitro group, an amino group, a cyano group, a methoxy group, and an acetoxy group as described above are unnecessary. However, since the hydrophobic property is greatly improved by a fluorine atom as compared with a hydrogen atom, it is preferred to use a group having a fluorine atom.

Preferred embodiments of the copolymerized polyamic acid salt of this invention are the salt having the recuring unit represented by formula (1)

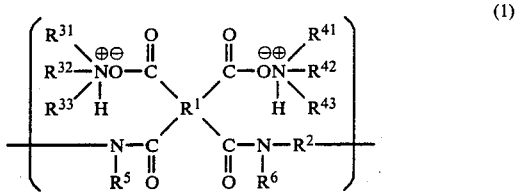

(1)

wherein, $R^1$ represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$ and $R^6$ each represents a monovalent group having 1 to 30 carbon atoms selected from the group consisting of an aliphatic group, an alicyclic group, an aromatic group and a group in which an aliphatic group is combined with an alicyclic group or an aromatic group. Still further, these substituents may be further substituted by a univalent group such as a halogen atom, a nitro group, an amino group, a cyano group, a methoxy group, or an acetoxy group, or a hydrogen atom; at least two of said $R^{31}$, $R^{32}$, $R^{33}$, $R^{41}$, $R^{42}$, $R^{43}$, $R^5$, and $R^6$ are not simultaneously the aforesaid group having 1 to 11 carbon atoms or a hydrogen atom, in which and x and y represent a ratio, and $0<x<1$, $0<y<1$, and $x+y=1$, and the salt represent by formula

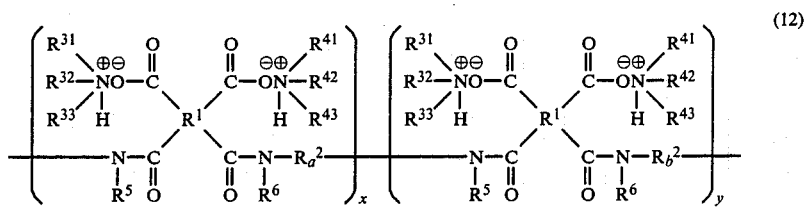
(12)

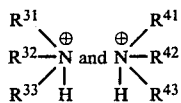

are selected to have different structure, the salt represented by formula wherein, $R^1$ represents a tetravalent group having at least 2 carbon atoms; $R_a^2$ and $R_b^2$ each represents a divalent group having at least 2 carbon atoms; $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic

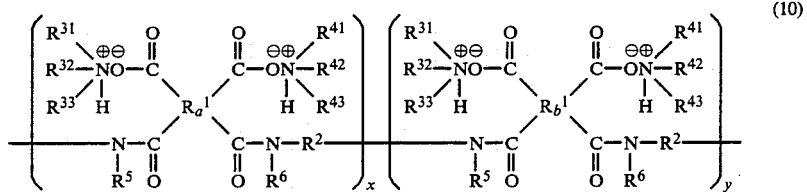
(10)

wherein, $R_a^1$ and $R_b^1$ each represents a tetravalent group having at least 2 carbon atoms; $R^2$ represents a divalent group having at least 2 carbon atoms; $R^{31}$, $R^{32}$, $R^{33}$, $R^{41}$, $R^{42}$, $R^{43}$, $R^5$ and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom;

group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and x and y represent a ratio and $0<x<0$, $0<y<1$, and $x+y=1$.

More preferred embodiments of this invention are the salts represented by aforesaid formulae (1), (10), and (12), wherein $R^5$ and $R^6$ are a hydrogen atom, and in these cases, the aforesaid formulae are, respectively, shown as follows.

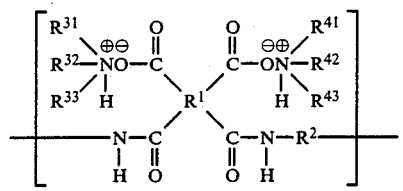

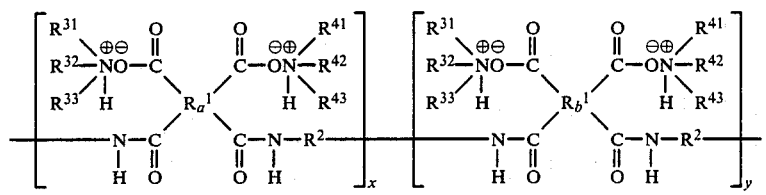

-continued

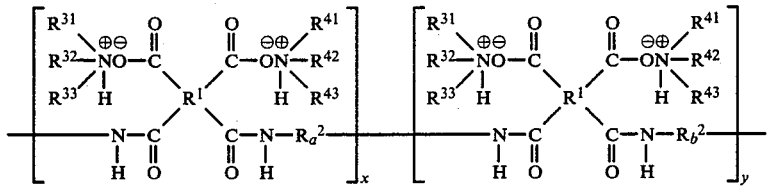

Further preferred embodiment of the copolymerized polyamic acid salt of this invention are the salt having the recurring unit represented by formula (1) wherein a part of at least one of $R^1$ and $R^2$ is substituted with a substituent having a different valence.

First, in the case of substituting a part of $R^1$ in formula (1), other groups than a tetravalent group having at least 2 carbon atoms are used and, for example, a divalent group or a trivalent group can be used but the use of a trivalent group is preferred from an aspect of heat resistance. In this case, formula (1) becomes as following formula (102) or (103):

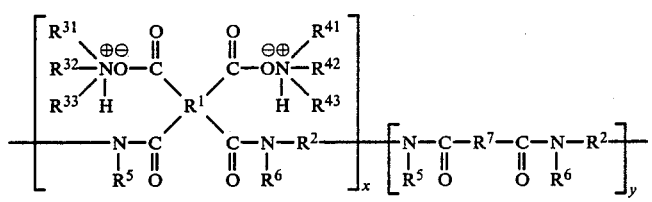

(102)

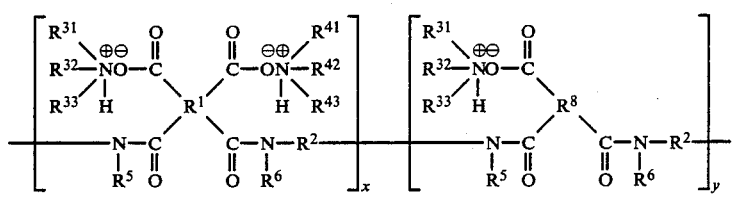

(103)

wherein, $R^1$, $R^2$, $R^{31}$, $R^{32}$, $R^{33}$, $R^{41}$, $R^{42}$, $R^{43}$, $R^5$, and $R^6$ have the same significance as defined above and $R^7$ and $R^8$ are a divalent group and a trivalent group, respectively, each having at least 2 carbon atoms.

Then, a group for substituting a part of $R^2$ is selected from other group than a divalent group having at least 2 carbon atoms and is preferably a trivalent group or a tetravalent group. In this case, formula (1) becomes as following formula (104) or (105):

wherein, $R^1$, $R^2$, $R^{31}$, $R^{32}$, $R^{33}$, $R^{41}$, $R^{42}$, $R^{43}$, $R^5$, and $R^6$ have the same significance as defined above and $R^9$ and $R^{10}$ are a trivalent group and a tetravalent group, respectively, each having at least 2 carbon atoms. X and Y are substituents for $R^{10}$ and are preferably —NHR, —CONHR, etc., (wherein, R represents an alkyl group or a hydrogen atom).

The modification of the copolymerized polyamic acid salt in this invention is important for improving the building-up characteristics of the thin film of the salt by a Langmuir Brodgett method and the properties of a polyimide thin film obtained by imidating (ring closing) the build-up film on a substrate. In particular, when a part of $R^2$ is substituted by a trivalent group or a tetravalent group, the formation of a ring structure having higher heat resistance than an imide ring can be realized.

$R^7$, $R^8$, $R^9$ or $R^{10}$ which substitutes a part of at least one of $R^1$ and $R^2$ is at least divalent group having at least 2 carbon atoms, and preferably 5 to 20 carbon atoms, which may be an aromatic group; an alicyclic group; an

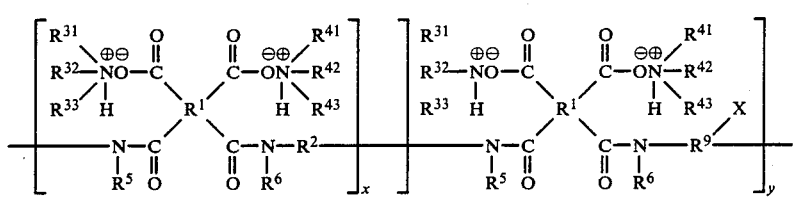

(104)

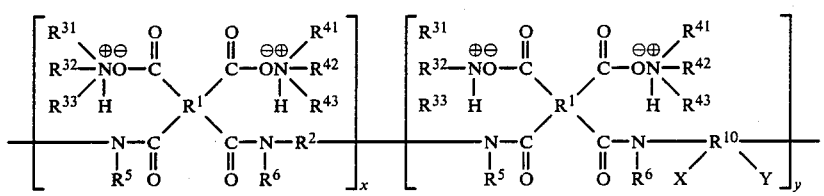

(105)

aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred at $R^1$ in points of heat resistance, chemical resistance and mechanical properties.

Preferred examples of $R^7$, $R^8$, $R^9$ or $R^{10}$ described above are, for example, as follows.

[structures: phenylene, biphenylene]

[structures: naphthylene, and diphenyl-$R^{11}$-diphenyl]

wherein $R^{11}$ represent —$(CH_2)_m$— (m is an integer of 1 to 3)

$$-\underset{CH_3}{\underset{|}{\overset{CH_3}{\overset{|}{C}}}}-,\quad -\underset{CF_3}{\underset{|}{\overset{CF_3}{\overset{|}{C}}}}-,$$

—O—, —CO—, —S—, —SO$_2$—, —NR$^{11}$—, $$-\underset{R^{12}}{\underset{|}{\overset{R^{12}}{\overset{|}{Si}}}}-,\quad -O-\underset{R^{13}}{\underset{|}{\overset{R^{12}}{\overset{|}{Si}}}}-O-,\quad -O-\underset{\|}{\underset{O}{\overset{R^{12}}{\overset{|}{P}}}}-O-,\quad -\underset{\|}{\underset{O}{\overset{R^{12}}{\overset{|}{P}}}}-$$

wherein $R^{12}$ and $R^{13}$ each represent an alkyl group having 1 to 30 carbon atoms or an aryl group.

$$-(CH_2)_4\underset{CH_3}{\underset{|}{\overset{CH_3}{\overset{|}{C}}}}-\phenyl-\underset{CH_3}{\underset{|}{\overset{CH_3}{\overset{|}{C}}}}(CH_2)_4-$$

[structures: xylylene, and dicyclohexylmethane]

$-(CH_2)_p$ (p = 2~10), $-(CH_2)_4-\underset{H}{\underset{|}{\overset{CH_3}{\overset{|}{C}}}}-(CH_2)_2$, -continued $$-(CH_2)_3\underset{CH_3}{\underset{|}{\overset{CH_3}{\overset{|}{C}}}}(CH_2)_3-,\quad -(CH_2)-\underset{CH_3}{\underset{|}{\overset{CH_3}{\overset{|}{C}}}}(CH_2)_3-,$$

$$-(CH_2)_{10}CH-CH_3,\quad -(CH_2)_3-\underset{H}{\underset{|}{\overset{CH_3O}{\overset{|}{C}}}}(CH_2)_2-,$$

$-(CH_2)_2-O-(CH_2)_2-O-(CH_2)_3-$, $$-CH_2-\underset{H}{\underset{|}{\overset{CH_3}{\overset{|}{C}}}}(CH_2)_2\underset{H}{\underset{|}{\overset{CH_3}{\overset{|}{C}}}}-CH_2-,\quad -(CH_2)_2\underset{H}{\underset{|}{\overset{CH_3}{\overset{|}{C}}}}(CH_2)_2\underset{H}{\underset{|}{\overset{CH_2}{\overset{|}{C}}}}-CH_2-,$$

$$-(CH_2)_3-\underset{CH_3}{\underset{|}{\overset{CH_3}{\overset{|}{Si}}}}-O-\underset{CH_3}{\underset{|}{\overset{CH_3}{\overset{|}{Si}}}}-(CH_2)_3-,$$

$$-(CH_2)_4-\underset{CH_3}{\underset{|}{\overset{CH_3}{\overset{|}{Si}}}}-O-\underset{CH_3}{\underset{|}{\overset{CH_3}{\overset{|}{Si}}}}-(CH_2)_3-,$$

$$-(CH_2)_3-\underset{C_6H_5}{\underset{|}{\overset{C_6H_5}{\overset{|}{Si}}}}-O-\underset{C_6H_5}{\underset{|}{\overset{C_6H_5}{\overset{|}{Si}}}}-(CH_2)_3-,$$

[structure: tolyl-Si(CH$_3$)$_2$-O-Si(CH$_3$)(CH$_2$)-tolyl]

$$-(CH_2)_3-\underset{C_6H_5}{\underset{|}{\overset{CH_3}{\overset{|}{Si}}}}-O-\underset{C_6H_5}{\underset{|}{\overset{CH_3}{\overset{|}{Si}}}}-(CH_2)_3-,$$

$$-(CH_2)_3-\underset{CH_3}{\underset{|}{\overset{CH_3}{\overset{|}{Si}}}}-O-\underset{CH_3}{\underset{|}{\overset{CH_3}{\overset{|}{Si}}}}-O-\underset{CH_3}{\underset{|}{\overset{CH_3}{\overset{|}{Si}}}}-(CH_2)_3-,$$

$$-(CH_2)_3-\underset{CH_3}{\underset{|}{\overset{CH_3}{\overset{|}{Si}}}}-O-(\underset{CH_3}{\underset{|}{\overset{CH_3}{\overset{|}{Si}}}}-O)_n-\underset{CH_3}{\underset{|}{\overset{CH_3}{\overset{|}{Si}}}}-(CH_2)_3-,$$

(n = 2~15)

[structures: phenylene, naphthylene, biphenylene]

-continued

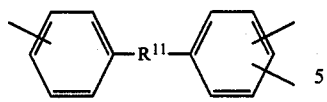

wherein R[11] is as defined above

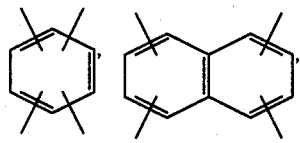

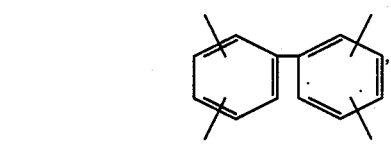

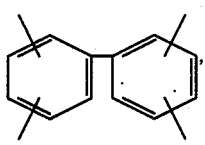

wherein R[11] is as defined above

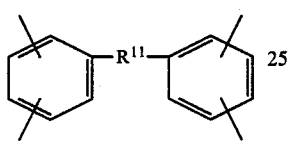

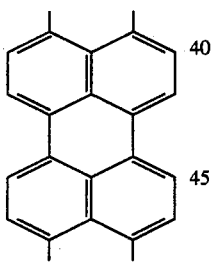

Of these groups more preferable examples are as follows.

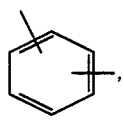

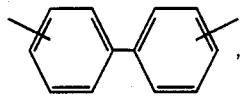

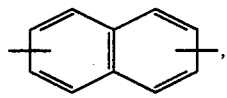

-continued

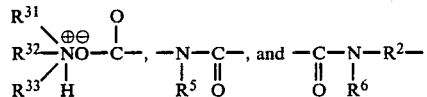

wherein R[11] is as defined above.

There is no particular restriction on the positions of the three to four bonds of R[8], R[9], or R[10], and the four bonds of R[1], that is, the positions of the bond linking

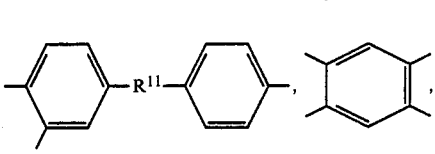

or the hands of bonding to X or Y in the recurring unit shown by formulae (102), (103), (104) and (105) described above. However, the case that each two of the bonds exist at the adjoining 2 carbon atoms constituting $R^1$, $R^8$, $R^9$ or $R^{10}$ is preferred since in the case of polyimidating a film formed by using an amphiphilic polyimide precursor, $R^1$, $R^8$, $R^9$ or $R^{10}$ is liable to form a 5-membered ring and is liable to be imidated.

Practical examples of the recurring unit of the amphiphilic polyimide precursor of this invention when $R^5$ and $R^6$ are a hydrogen atom are shown by following formulae (107), (108) and (109);

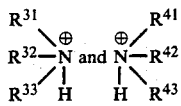

are selected to have different structure],

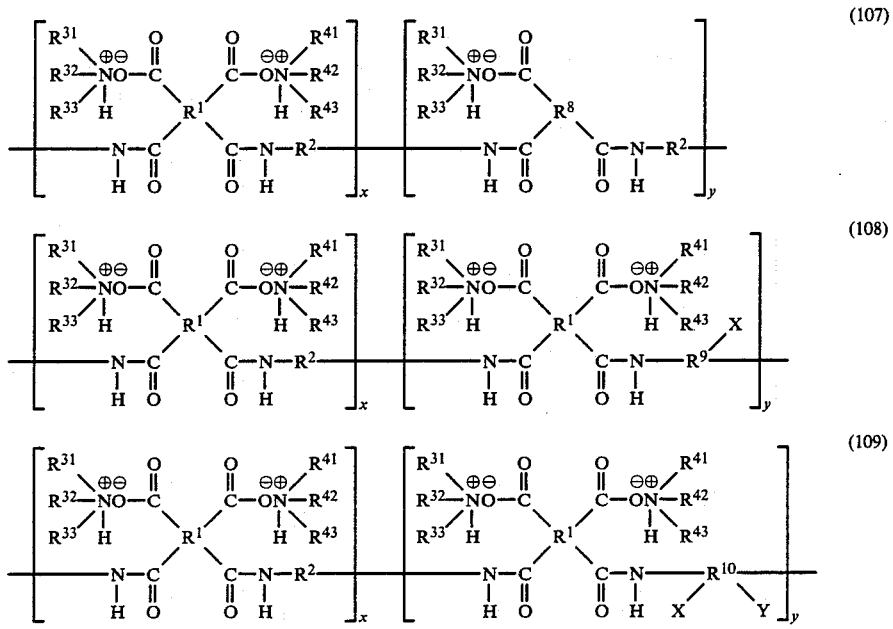

wherein, $R^1$, $R^2$, $R^{31}$, $R^{32}$, $R^{33}$, $R^{41}$, $R^{42}$, $R^{43}$, $R^8$, $R^9$, $R^{10}$, X, Y, x and y are as defined above; at least one of said $R^{31}$, $R^{32}$, and $R^{33}$ and at least one of said $R^{41}$, $R^{42}$, $R^{43}$ are not the group having 1 to 11 carbon atoms or a hydrogen atom.

The copolymerized polyamic acid salt of this invention shown by each of the above-described formulae is preferred from the points that the compound can be easily produced and the production cost is low.

Practical examples of the amphiphilic polyimide precursor of this invention having the recuring unit shown by formula (1), (10), (12), (102), (103), (104) and (105) described above are as follows:

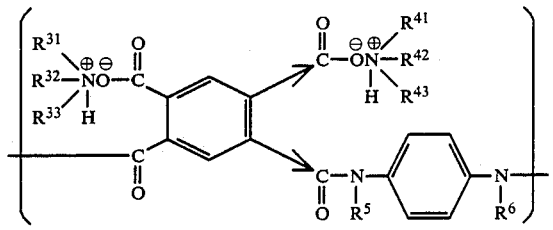

[wherein, specific examples of $R^{31}$, $R^{32}$, $R^{33}$, $R^{41}$, $R^{42}$, and $R^{43}$ are H—, CH$_3$—, C$_2$H$_5$—, C$_3$H$_7$—,

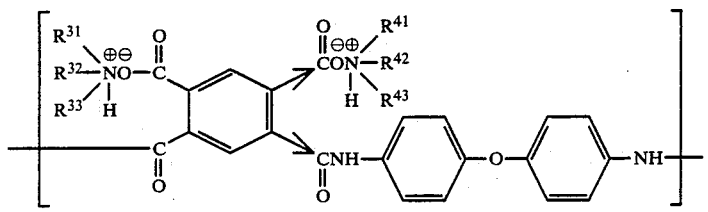

[wherein, specific examples of $R^{31}$, $R^{32}$, $R^{33}$, $R^{41}$, $R^{42}$, and $R^{43}$ are H—, CH$_3$—, C$_2$H$_5$—, C$_3$H$_7$—, CH$_3$(CH$_3$)$_{11}$, CH$_3$(CH$_2$)$_{13}$, CH$_3$(CH$_2$)$_{15}$, CH$_3$(CH$_2$)$_{17}$, CH$_3$(CH$_2$)$_{19}$, CH$_3$(CH$_2$)$_{21}$, CF$_3$(CH$_2$)$_{15}$, etc., and CH$_3$(CH$_2$)$_{11}$, CH$_3$(CH$_2$)$_{13}$, CH$_3$(CH$_2$)$_{15}$, CH$_3$(CH$_2$)$_{17}$, CH$_3$(CH$_2$)$_{19}$, CH$_3$(CH$_2$)$_{21}$, CF$_3$(CH$_2$)$_{15}$, etc., specific examples of $R^5$ and $R^6$ are CH$_3$, CH$_3$(CH$_2$)$_2$, CH$_3$(CH$_2$)$_3$, CH$_3$(CH$_2$)$_5$, etc., and

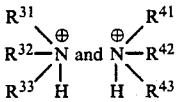

are selected to have different structure],

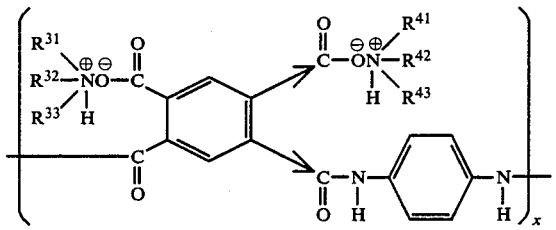
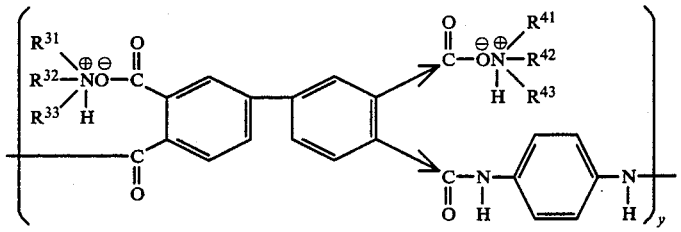
[wherein, specific examples of $R^{31}$, $R^{32}$, $R^{33}$, $R^{41}$, $R^{42}$, and $R^{43}$ are H—, $CH_3$, $C_2H_5$—, $C_3H_7$—, etc., and X and y represent a ratio, and $0<x<1$, $0<y<1$, $x+y=1$], and
[wherein, specific examples of $R^{31}$, $R^{32}$, $R^{33}$, $R^{41}$, $R^{42}$, and $R^{43}$ are H—, $CH_3$—, $C_2H_5$—, $C_3H_7$—, etc., and x and y represent a ratio, and $0<x<1$, $0<y<1$, $x+y=1$].
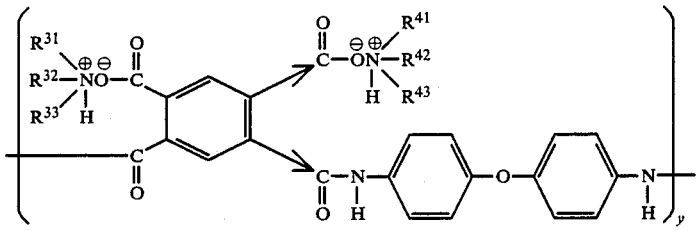
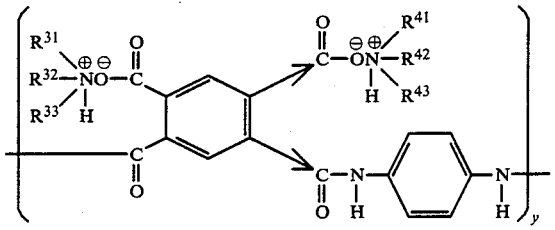
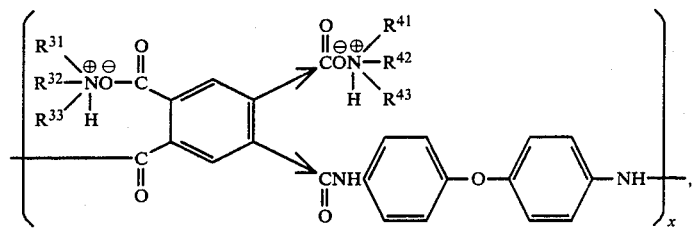
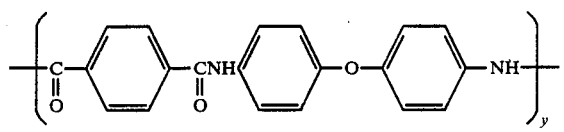
(wherein, specific examples of $R^{31}$, $R^{32}$, $R^{33}$, $R^{41}$, $R^{42}$, $R^{43}$ are H—, $CH_3$—, $C_2H_5$—, $C_3H_7$—, $CH_3(CH_2)_{11}-$, $CH_3(CH_2)_{13}-$, $CH_3(CH_2)_{15}-$, $CH_3(CH_2)_{17}-$, $CH_3(CH_2)_{19}-$,
$CH_3(CH_2)_{21}-$, $CF_3(CH_2)_{15}-$, etc.)
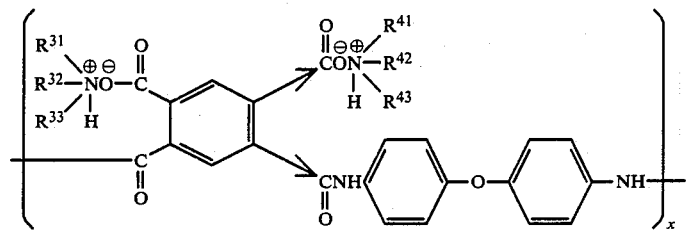
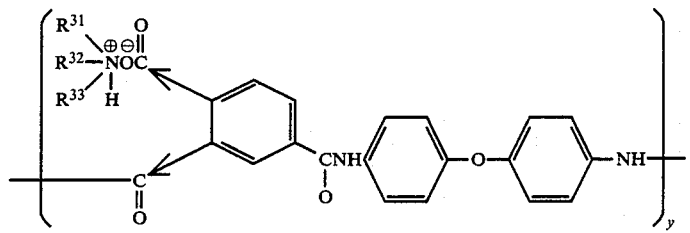
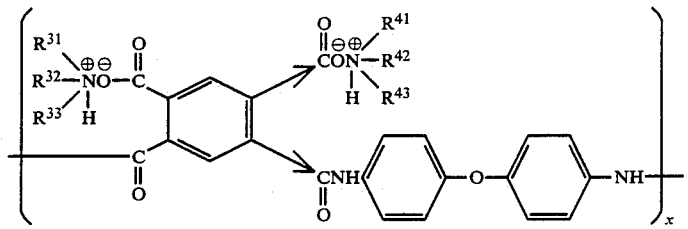
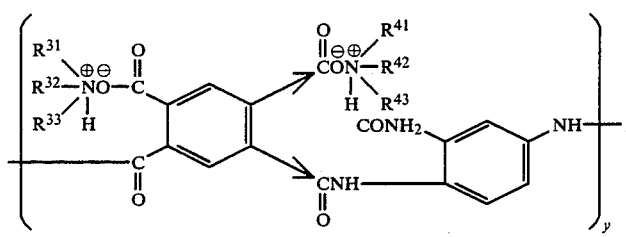
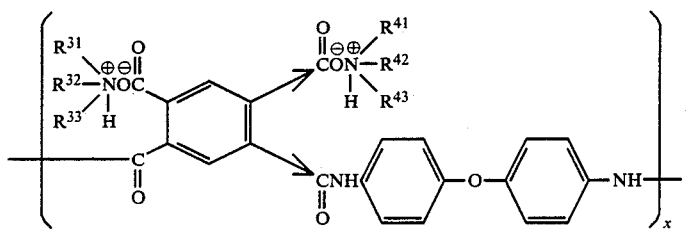
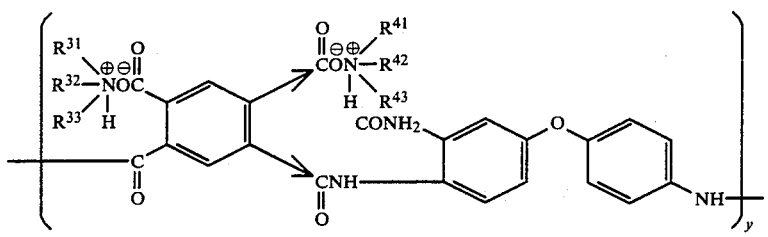

-continued

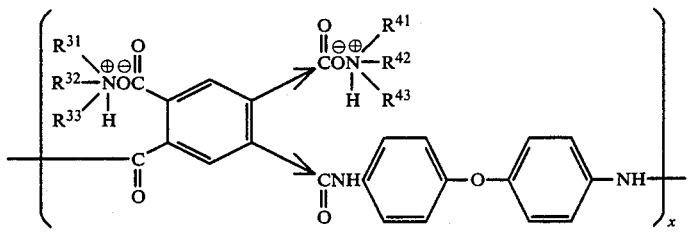

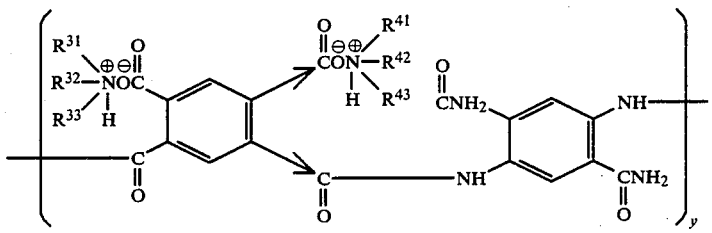

(wherein, specific examples of $R^{31}$, $R^{32}$, $R^{33}$, $R^{41}$, $R^{42}$, $R^{43}$ are H—, $CH_3$, $C_2H_5$—, $C_3H_7$—, $CH_3(CH_2)_{11}$—, $CH_3(CH_2)_{13}$—, $CH_3(CH_2)_{15}$—, $CH_3(CH_2)_{17}$—, $CH_3(CH_2)_{19}$—, $CH_3(CH_2)_{21}$—, $CF_3(CH_2)_{15}$—, etc.)

$CH_3(CH_2)_{7}$, $CH_3(CH_2)_{7}$, $CH_3(CH_2)_{7}$, etc.

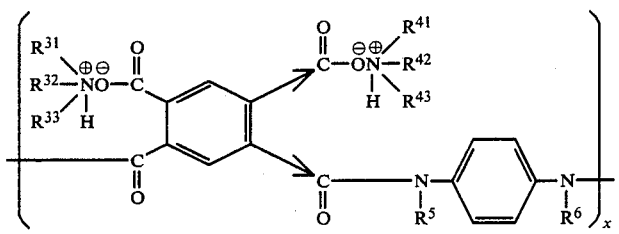

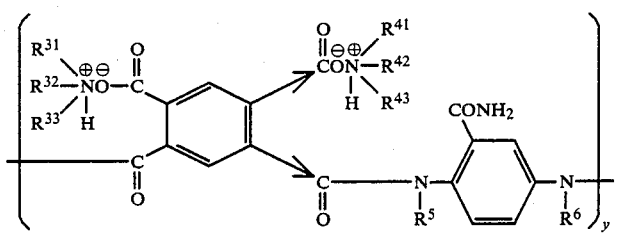

wherein, specific examples of $R^{31}$, $R^{32}$, $R^{33}$, $R^{41}$, $R^{42}$, and $R^{43}$ are H—, $CH_3$—, $C_2H_5$—, $C_3H_7$—, etc., and specific examples of $R^5$ and $R^6$ are $CH_3$—, In the above formulae, the mark→indicates an isomerization. For example, the isomerization of the following formula

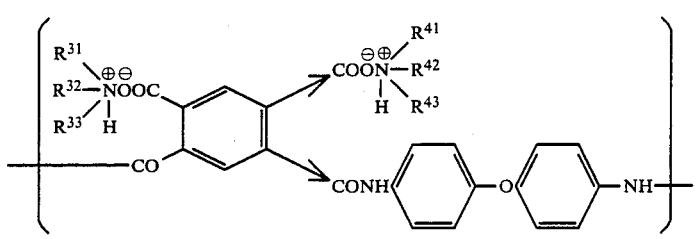

are shown by following formula (a) and (b);

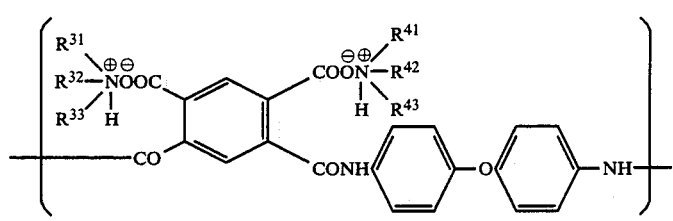
(a)

and

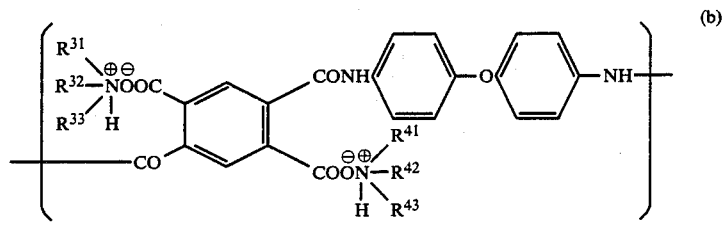
(b)

This invention includes the case that (a) and (b) are independent from each other and the case that (a) and (b) coexistence.

The amphiphilic polyimide precursor of this invention as described above is easily soluble in an organic polar solvent such as N,N-dimethylacetamide, N,N-dimethylformamide, N,N-diethylformamide, hexamethylphosphoramide, etc., is soluble in a mixed solvent of the aforesaid organic polar solvent and an ordinary organic solvent such as chloroform, and is sparingly soluble or insoluble in an ordinary organic solvent such as benzene, ether, chloroform, acetone, methanol, etc.

According to an infrared absorption spectral analysis, there exist absorptions characteristic to an amide, a carboxylate, and a long-chain alkyl group.

By immersing the amphiphilic polyimide precursor in an imidation reagent such as acetic anhydride, pyridine, etc., the imidation thereof is completed. After the completion of the imidation, the absorptions of the amide, carboxylate, and long-chain alkyl group vanish and the absorption of an imide ring appears.

In the above explanation, the recurring units of the precursors of this invention are all the recurring units shown by formula (1) described above but a recurring unit represented by following formula (9) may be included therein in the range of not more than 30% by weight;

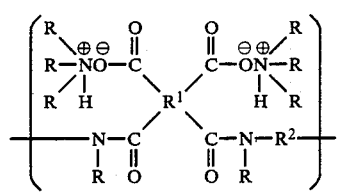
(9)

wherein, $R^1$ and $R^2$ have the same significance as defined above and R represents a monovalent group having 1 to 30 carbon atoms selected from the group consisting of an aliphatic group, an alicyclic group, an aromatic group and a group in which an aliphatic group is combined with an alicyclic group or an aromatic group. These substituents may be further substituted by a monovalent group such as a halogen atom, a nitro group, an amino group, a cyano group, a methoxy group or an acetoxy group, or a hydrogen atom; said four Rs may be the same or different.

Then, the production process for the polymerized polyamic acid salt of this invention is explained.

That is, the polymerized polyamic acid salt of this invention is obtained by reacting a tetracarboxylic acid dianhydride represented by formula (4)

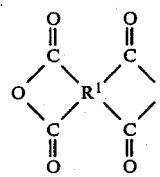
(4)

wherein, $R^1$ represents a tetravalent group having at least 2 carbon atoms and a compound represented by formula

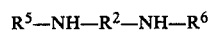

$$R^5-NH-R^2-NH-R^6 \quad (6)$$

wherein, $R^2$ represents a divalent group having at least 2 carbon atoms and $R^5$ and $R^6$ each represents a monovalent group having 1 to 30 carbon atoms selected from the group consisting of an aliphatic group, an alicyclic group, an aromatic group and a group in which an aliphatic group is combined with an alicyclic group or an aromatic group; each of these groups substituted by a halogen atom, a nitro group, an amino group, a cyano group, a methoxy group, or an acetoxy group, or a hydrogen atom at a temperature of not lower than $-10°$ C. preferably from 0° to 40° C. to provide a polyamic acid having a recurring unit shown by formula

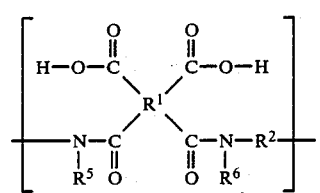
(8)

wherein, $R^1$, $R^2$, $R^5$, and $R^6$ have the same significance as defined above and then reacting the polyamic acid thus obtained with

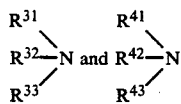

wherein $R^{31}$, $R^{32}$, $R^{33}$, $R^{41}$, $R^{42}$, and $R^{43}$ have the same significance as defined above and

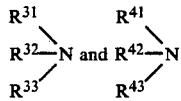

are selected to have different structure.

The aforesaid reaction of the tetracarboxylic acid dianhydride of formula (4) and the compound of formula (6) is ordinary conducted in a substantially water-free polar solvent at a temperature of not lower than $-10°$ C., preferably from $0°$ C. to $40°$ C.

The molecular weight of the polyamic acid obtained greatly differs according the reaction conditions employed, that is, a reaction temperature, the kinds of reaction reagents, the purity, purified extent, and water content of the solvent, and the ratio and the addition order of the compound of (4) and the compound of (6). In the case of obtaining the high molecular weight product, it is preferred that the reaction is conducted at a low temperature using a reagent solvent having high purity and containing less water with a ratio of the compound of formula (4) and the compound of formula (6) near 1 as close as possible.

A preferred embodiment of this invention is not always a copolymerized polyamic acid salt having high viscosity and hence a copolymerized polyamic acid salt of this invention can be very easily synthesized without controlling the reaction conditions severely as described above.

There is no particular restriction on the process of reacting the polyamic acid of (8) thus obtained with

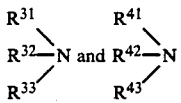

but the copolymerized polyamic acid salt of this invention is obtained by mixing a solution of the polyamic acid of formula (8) in a mixed solvent of an organic polar solvent and benzene or chloroform, which is preferably as a spreading solvent for LB method and a solution

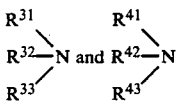

dissolved in a solvent having the same composition as above.

Now, specific examples of the compound shown by formula (4) described above are as follows;

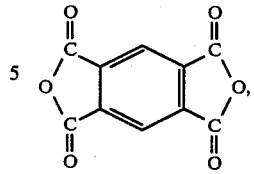

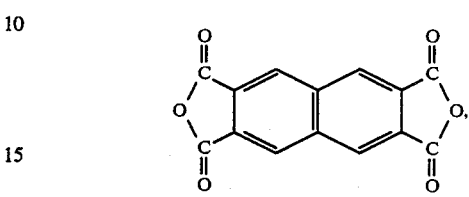

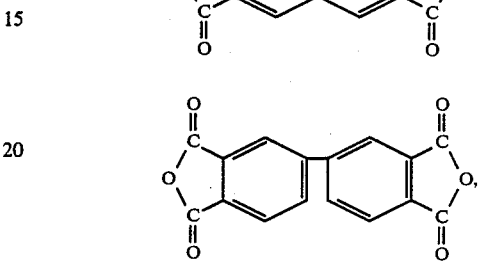

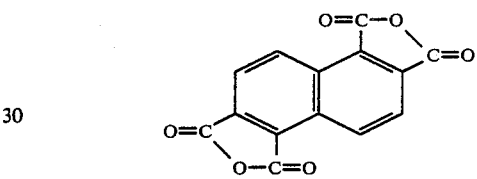

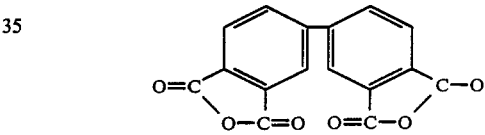

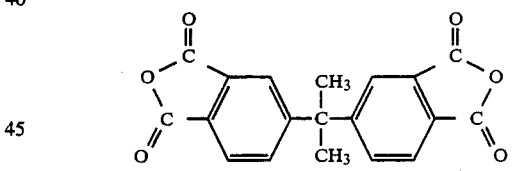

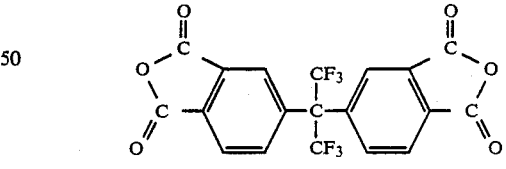

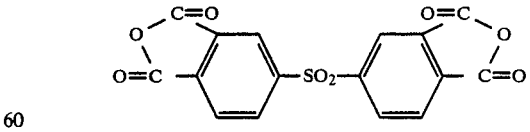

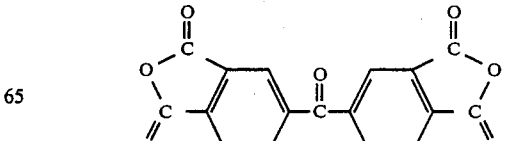

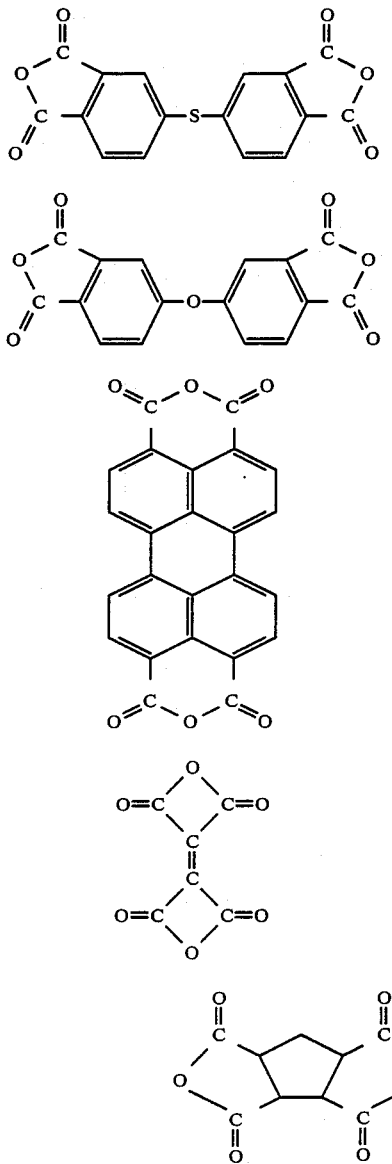
Specific examples of the compound shown by formula (6) described above are as follows:
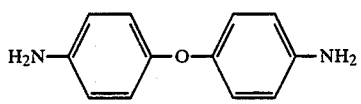
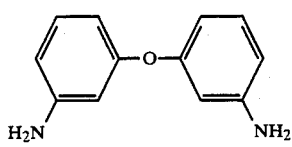
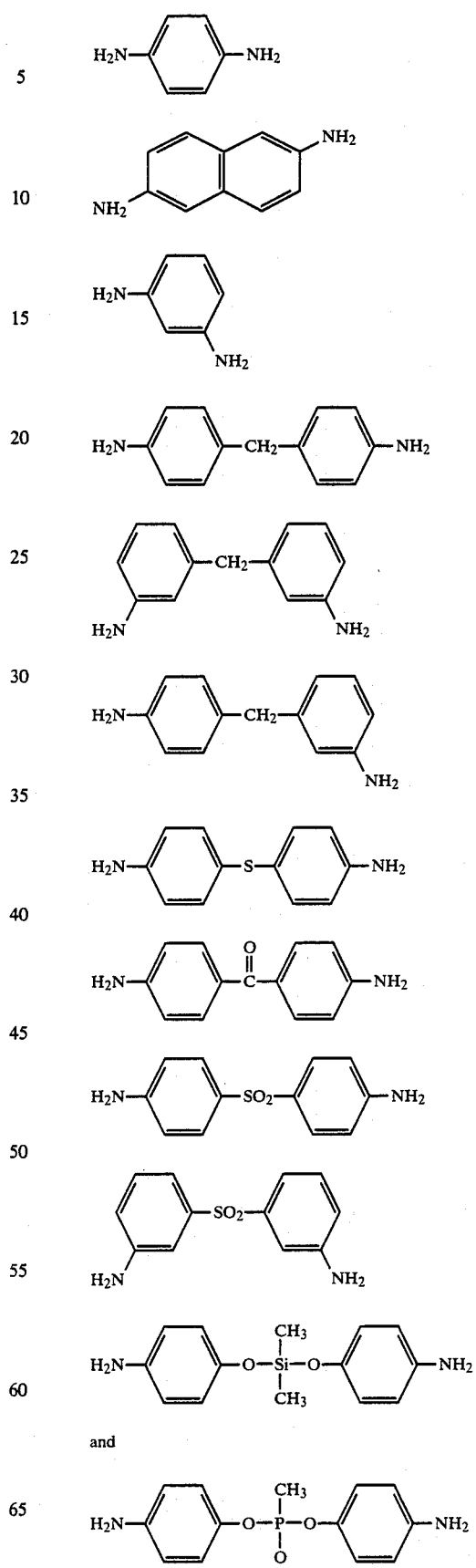
and Also, specific examples of

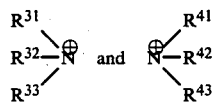

are as follows: $CH_3(CH_2)_{11}NH_2$, $CH_3(CH_2)_{13}NH_2$, $CH_3(CH_2)_{15}NH_2$, $CH_3(CH_2)_{17}NH_2$, $CH_3(CH_2)_{19}NH_2$, $CH_3(CH_2)_{21}NH_2$, $CH_3(CH_2)_{23}NH_2$, $CF_3(CH_2)_{15}NH_2$, $H(CF_2)_2(CH_2)_{15}NH_2$, $H(CF_2)_4(CH_2)_{13}NH_2$, $F(CF_2)_8(CH_2)_2NH_2$, $F(CF_2)_8(CH_2)_4NH_2$,

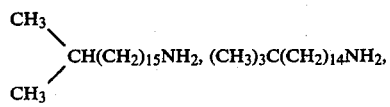

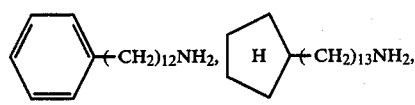

$CH_3(CH_2)_{11}NH(CH_3)$, $CH_3(CH_2)_{13}NH(CH_3)$, $CH_3(CH_2)_{15}NH(CH_3)$, $CH_3(CH_2)_{17}NH(CH_3)$, $CH_3(CH_2)_{19}NH(CH_3)$, $CH_3(CH_2)_{21}NH(CH_3)$, $CH_3(CH_2)_{23}NH(CH_3)$, $CF_3(CH_2)_{15}NH(CH_3)$, $H(CF_2)_4(CH_2)_{13}NH(CH_3)$, $F(CF_2)_3(CH_2)_2NH(CH_3)$,

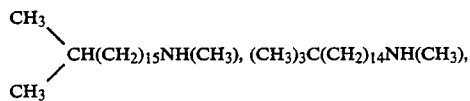

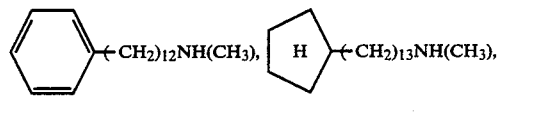

$CH_3(CH_2)_{11}N(CH_3)_2$, $CH_3(CH_2)_{13}N(CH_3)_2$, $CH_3(CH_2)_{15}N(CH_3)_2$, $CH_3(CH_2)_{17}N(CH_3)_2$, $CH_3(CH_2)_{19}N(CH_3)_2$, $CH_3(CH_2)_{21}N(CH_3)_2$, $CH_3(CH_2)_{23}N(CH_3)_2$, $CF_3(CH_2)_{15}N(CH_3)_2$, $H(CF_2)_4(CH_2)_{13}N(CH_3)_2$, $F(CF_2)_8(CH_2)_2N(CH_3)_2$,

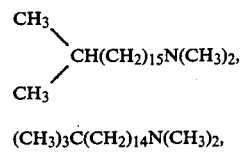

$(CH_3)_3C(CH_2)_{14}N(CH_3)_2$,

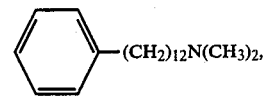

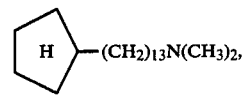

and

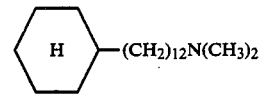

Also, the production process for the copolymerized polyamic acid salt shown by formula (10) or (12) is as follows:

That is, the copolymerized polyamic acid salt shown by formula (10) is produced by reacting at least two kinds of tetracarboxylic acid anhydrides represented by formula

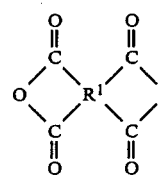 (4)

wherein, $R^1$ represents a tetravalent group having at least 2 carbon atoms and a compound represented by formula

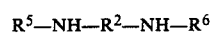 (6)

wherein, $R^2$ represents a divalent group having at least 2 carbon atoms and R, and R each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at a temperature of not lower than $-10°$ C. preferably from $0°$ to $40°$ C. to provide a polyamic acid having a recurring unit represented by formula

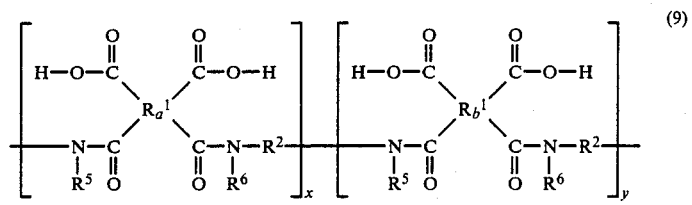 (9)

wherein, $R^2$, $R^5$, and $R^7$ have the same significance as defined above; $R_a^1$ and $R_b^1$ have the same significance as defined on $R^1$; and x and y represent a ratio and $0<x<1$, $0<y<1$, $x+y=1$ and reacting the polyamic acid thus obtained with

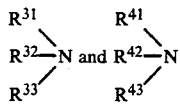

wherein, $R^{31}$, $R^{32}$, $R^{33}$, $R^{41}$, $R^{42}$, and $R^{43}$ have the same significance as defined on $R^5$ and $R^6$.

The copolymerized polyamic acid salt shown by formula (12) is produced by reacting a tetracarboxylic acid dianhydride represented by formula

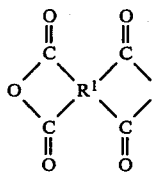
(4)

wherein, $R^1$ represents a tetravalent group having at least 2 carbon atoms and at least two kinds of compounds represented by formula $$R^5-NH-R^2-NH-R^6 \quad (6)$$

wherein, $R^2$ represents a divalent group having at least 2 carbon atoms and $R^5$ and $R^6$ each represents a monovalent group having 1 to 30 carbon atoms selected from the group consisting of an aliphatic group, an alicyclic group, an aromatic group and a group in which an aliphatic group is combined with an alicyclic group or an aromatic group. Still further, these substituents may be further substituted by a univalent group such as a halogen atom, a nitro group, an amino group, a cyano group, a methoxy group, or an acetoxy group, or a hydrogen atom at a temperature of not lower than $-10°$ C. preferably from $0°$ to $40°$ C. to provide a polyamic acid having a recurring unit represented by formula

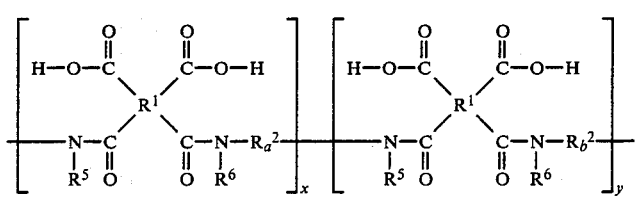
(11)

wherein, $R^1$, $R^5$, and $R^6$ have the same significance as defined above; $R_a^2$ and $R_b^2$ have the same significance as defined on $R^2$; and x and y represent a ratio and $0<x<1$, $0<y<1$, $x+y=1$ and then reacting the polyamic acid thus obtained with

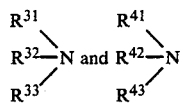

wherein, $R^{31}$, $R^{32}$, $R^{33}$, $R^{41}$, $R^{42}$, and $R^{43}$ have the same significance as defined on $R^5$ and $R^6$.

The precursors of this invention having the recurring units shown by above-described formulae thus obtained have the features that the productions thereof are easy as well as they can form a film by an LB method and can give polyimides by heating.

The polyamic acid salt of this invention shown by formula (102) described above is produced by reacting a tetracarboxylic acid dianhydride shown by formula

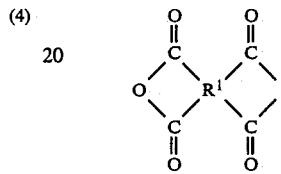
(4)

wherein, $R^1$ is a tetravalent group having at least 2 carbon atoms, an acid halide formed in a substantially water free polar organic solvent from a compound shown by formula

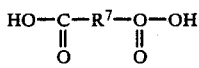
(11)

wherein, $R^7$ is same as defined above, and a compound shown by formula $$R^5-NH-R^2-NH-R^6 \quad (6)$$

wherein, $R^2$ represents a divalent group having at least 2 carbon atoms; and $R^5$ and $R^6$ each represents univalent monovalent group having 1 to 30 carbon atoms selected from the group consisting of an aliphatic group, an alicyclic group, an aromatic group and a group in which an aliphatic group is combined with an alicyclic group or an aromatic group, each of these groups substituted by a halogen atom, a nitro group, an amino group, a cyano group, a methoxy group, or an acetoxy group, or a hydrogen atom at a temperature of not lower than $-10°$ C., preferably from $0°$ to $40°$ C. to provide a compound shown by the formula

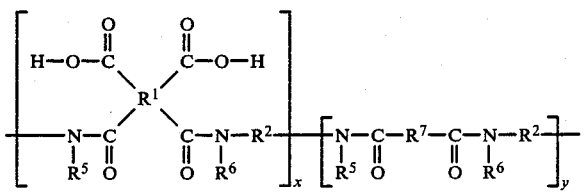

and reacting the compound thus obtained with

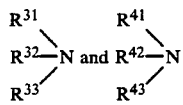

wherein, $R^{31}$, $R^{32}$, $R^{33}$, $R^{41}$, $R^{42}$, and $R^{43}$ have the same significance as defined above on $R^5$ and $R^7$.

The compound shown by formula (11) described above is converted into the acid halide in a substantially water free polar organic solvent at a temperature of not lower than $-10°$ C., and preferably from 0° C. to 40° C. using thionyl chloride, phosphorus pentachloride, benzenesulfonyl chloride, etc.

The reaction of the aforesaid tetracarboxylic acid dianhydride, the acid halide, and a compound of formula (6) described above is performed at a temperature of not lower than $-10°$ C., and preferably from about 0° C. to about 40° C.

In this case, the compound of formula (6) may be added to a mixture of the tetracarboxylic acid dianhydride and the acid halide or other addition order may be employed.

The molecular weight of the polyamic acid obtained differs greatly according to the reaction conditions employed, that is, the reaction temperature, the reaction reagents, the purity and water content of the solvent, the ratio and addition order of the acid component and the diamine component.

In addition, specific examples of the compound shown by formula (11) are as follows:

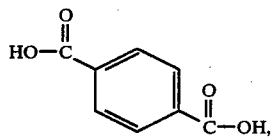

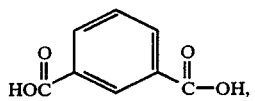

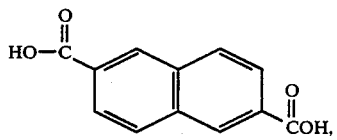

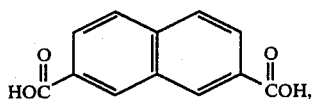

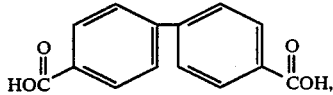

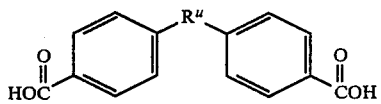

The polyamic acid salt of this invention shown by formula (103) described above is produced by reacting a tetracarboxylic acid dianhydride shown by formula

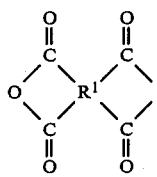

(4)

wherein, $R^1$ is a tetravalent group having at least 2 carbon atoms, an acid halide formed in a substantially water free polar organic solvent from a compound shown by formula

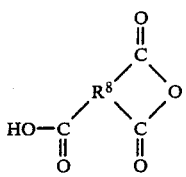

(13)

wherein, $R^8$ is as defined above, and a compound represented by formula $$R^5\text{—NH—}R^2\text{—NH—}R^6 \qquad (6)$$

wherein, $R^2$ represents a divalent group having at least 2 carbon atoms; and $R^5$ and $R^6$ each represents monovalent group having 1 to 30 carbon atoms selected from the group consisting of an aliphatic group, an alicyclic group, an aromatic group and a group in which an aliphatic group is combined with an alicyclic group or an aromatic group. Still further, these substituents may be further substituted by a univalent group such as a halogen atom, a nitro group, an amino group, a cyano group, a methoxy group, or an acetoxy group, or a hydrogen atom at a temperature of not lower than $-10°$ C. and preferably from 0° to 40° C. to provide a compound shown by the formula

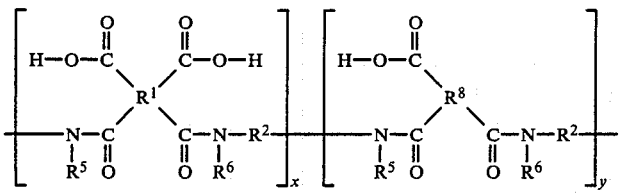

wherein, $R^1$, $R^2$, $R^5$, $R^6$, $R^8$, x and y are as define and then reacting the compound thus obtained with

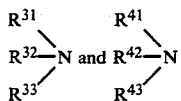

wherein $R^{31}$, $R^{32}$, $R^{33}$, $R^{41}$, $R^{42}$, $R^{43}$ are as defined in $R^5$ and $R^6$ above.

Specific examples of the compound shown by formula (13) are as follows:

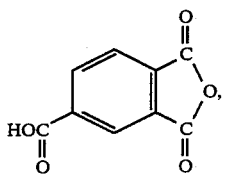

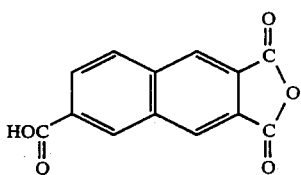

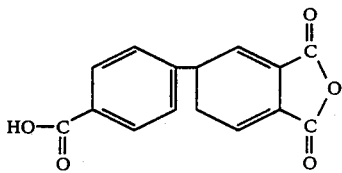

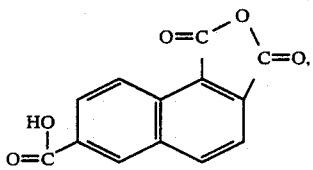

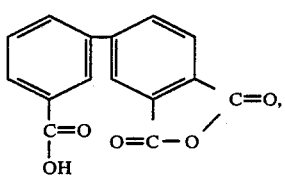

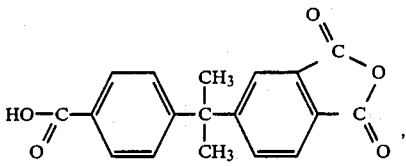

-continued

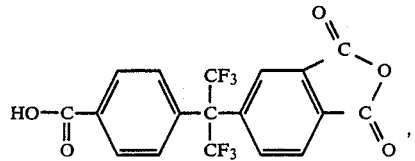

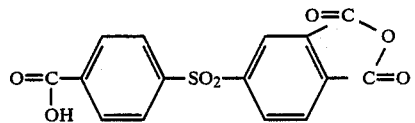

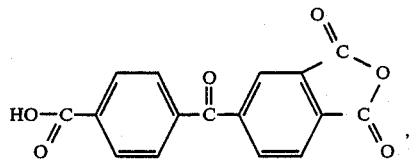

The copolymerized polyamic acid salt of this invention shown by formula (104) described above is produced by reacting a tetracarboxylic acid dianhydride represented by formula

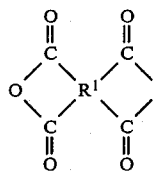
(4)

wherein, $R^1$ is a tetravalent group having at least 2 carbon atoms, a compound shown by formula

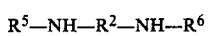
$$R^5-NH-R^2-NH-R^6 \quad (6)$$

wherein, $R^2$ represents a divalent group having at least 2 carbon atoms and $R^5$ and $R^6$ each represents a monovalent group having 1 to 30 carbon atoms selected from the group consisting of an aliphatic group, an alicyclic group, an aromatic group and a group in which an aliphatic group is combined with an alicyclic group or an aromatic group. Still further, these substituents may be further substituted by a univalent group such as a halogen atom, a nitro group, an amino group, a cyano group, a methoxy group, an acetoxy group, or a hydrogen atom, and a compound shown by formula

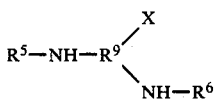
(14)

wherein, $R^2$ is a trivalent group having at least 2 carbon atoms; $R^5$ and $R^6$ are as defined above; $R^9$ is a trivalent group having at least 2 carbon atoms; and X is a substituent for R at a temperature of not lower than −10° C., preferably from about 0° C. to about 40° C. to provide a compound shown by the formula

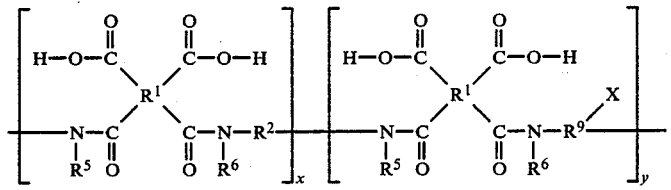

and reacting the compound thus obtained with

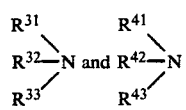

wherein, $R^{31}$, $R^{32}$, $R^{33}$, $R^{41}$, $R^{42}$, and $R^{43}$ have the same significance as defined above on $R^5$ and $R^6$.

Specific examples of the compound shown by formula (14) are as follows:

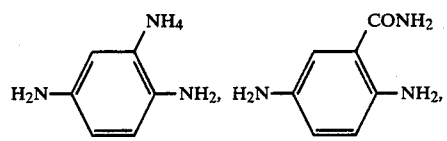

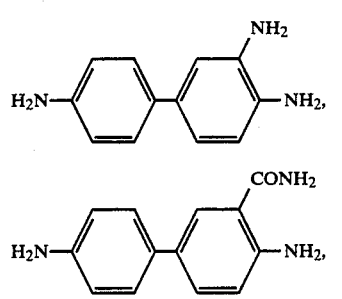

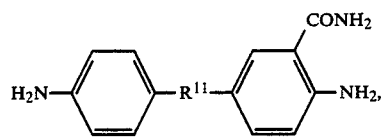

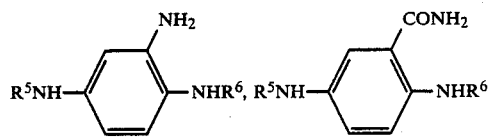

wherein, $R^{11}$ is as defined above and specific examples of $R^5$ and $R^6$ are same as those described above as to formula (6).

Furthermore, the copolymerized polyamic acid salt of this invention shown by formula (5) described above is produced by reacting a tetracarboxylic acid dianhydride shown by formula

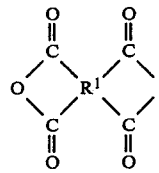
(4)

wherein, $R^1$ is a tetravalent group having at least 2 carbon atoms, a compound shown by formula $$R^5-NH-R^2-NH-R^6 \quad (6)$$

wherein, $R^2$ is a divalent group having at least 2 carbon atoms and $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; and a compound shown by formula

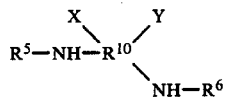
(15)

wherein, $R^2$ is a trivalent group having at least 2 carbon atoms; $R^5$ and $R^6$ are same as defined above; $R^{10}$ is a tetravalent group having at least 2 carbon atoms; and X and Y are substituents for $R^{10}$, at a temperature of not lower than −10° C., preferably from 0° C. to 40° C. to provide a compound having the formula

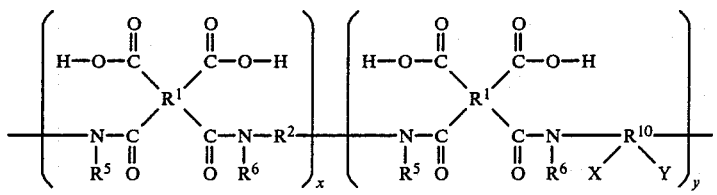

and reacting the compound thus obtained with

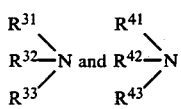

wherein, $R^{31}$, $R^{32}$, $R^{33}$, $R^{41}$, $R^{42}$, and $R^{43}$ have the same significance as defined above on $R^5$ and $R^6$.

Specific examples of the compound of formula (15) are as follows:

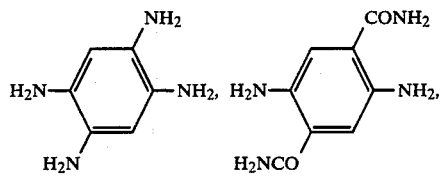

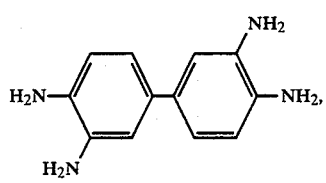

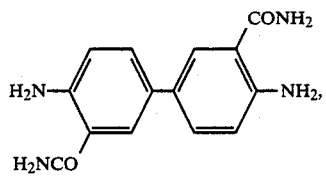

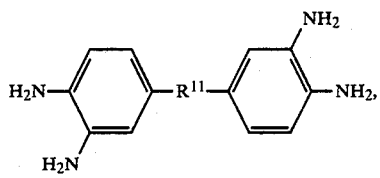

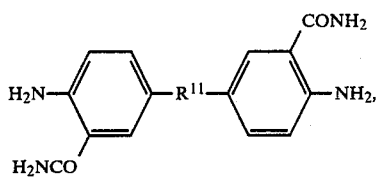

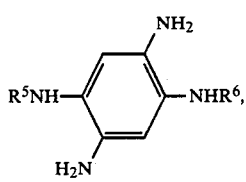

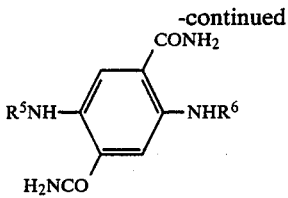

wherein, $R^{11}$ is same as defined above and specific examples of $R^5$ and $R^6$ are same as those described in regard to formula (6).

The precursor having the recurring unit shown by the aforesaid formula obtained by the process described above can be easily produced as well as has the features that a thin film can be formed by an LB method and also the precursor gives heat stable ring structure by heating.

Then, a process of forming a Langmuir Brodgett film using the precursors of this invention is explained. LB films can be formed from the precursors of the present invention by any of the so-called LB technique without restriction, e.g., the vertical dipping method (LB method), the horizontal dipping method, the revolving cylindrical method and so on (as described in Shin Jikken Kagaku Koza, Vol. 18, "Interface and Colloid", pages 498-508). The LB technique is a method in which a LB material is spread onto the surface of water and compressed at a constant surface pressure to form monomolecular layer film and the monomolecular layer is transferred onto a substrate.

The LB method is a method capable of controlling a thickness of an oriented film in an order of few tens Å unit and can form a thin film of less than few hundreds Å or less than few tens Å. The thin film of the copolymerized polyamic acid salt of this invention formed on a substrate has also such a feature. However, a film having a thickness of 10,000 Å or thicker can be formed by the method. Also, it has been confirmed that by mixing the high polymer compound of this invention with other known compound capable of forming an LB film, the film-forming property is improved and this embodiment is preferred in this invention.

The known compounds capable of forming LB film are those, for example, described in the above-cited literature and are known in the field of art. In particular, the compounds shown by the following formulae each composed of a hydrocarbon group having about 16 to 22 carbon atoms and a hydrophilic group are preferred;

$CH_3(CH_2)_{n-1}Z$, $CH_2=CH(CH_2)_{n-2}Z$, and $CH_3(CH_2)_lC\equiv C-C\equiv C(CH_2)_mZ$ wherein, n is from 16 to 22, l+m=n−5, and Z is OH, NH$_2$, NHR', NR'R', COOH, CONH$_2$, or COOR' (wherein, R' is a lower aliphatic hydrocarbon group).

In the aforesaid compounds, the compound shown by CH$_3$(CH$_2$)$_{n-1}$Z is excellent in the aspect of cost but the aforesaid compounds having unsaturated bond has a feature that it can be polymerized by the irradiation of light or other radiations.

There is no particular restriction on the mixing ratio of at least one of the aforesaid known compounds and the high molecular compound of this invention.

In the case of spreading a component capable of forming a film by the LB method, benzene, chloroform, etc., which is insoluble in water and evaporates into vapour phase is generally used as the solvent but in the case of spreading the high molecular compound of this invention, it is preferred to use an organic polar solvent together with the aforesaid solvent for improving the solubility thereof. Examples of the preferred organic polar solvent are N,N-dimethylformamide, N,N-dimethylacetamide, N,N-diethylformamide, N,N-diethylacetamide, N,N-dimethylmethoxycaetamide, dimethylsulfoxide, N-methyl-2-pyrrolidone, pyridine, dimethylsulfone, hexamethylsulfonamide, tetramethylenesulfone, dimethyltetramethylenesulfone, etc.

Accordingly, in the case of spreading a mixture of the high molecular compound of this invention and the known LB film-forming compound, it is preferred to use a mixed solvent of an ordinary solvent such as benzene, chloroform, etc., and an organic polar solvent as described above.

In the case of using benzene, chloroform, etc., with the organic polar solvent, benzene, chloroform, etc., evaporates into vapour phase when spreading film and also the organic polar solvent is considered to be dissolved in a large amount of water.

The substrate for use in this invention is determined according to the purpose for the application of the thin film of this invention but there are no other large restrictions. Examples of the substrate are general inorganic substrates such as glass, alimina, quartz, etc., as well as metals, plastics, semiconductors of groups, IV, III-V, II-VI, etc., of the Periodic Table, such as Si, GaAs, ZnS, etc., and ferroelectric substances such as PBTiO$_3$, BaTiO$_3$, LiNbo$_3$, LiTaO$_3$, etc. and magnetic substances. Furthermore, surface-treated materials can be also used in this invention.

In such surface treatments, the surface treatment by a silane coupling agent, in particular, a silane coupling agent having an amino group or an epoxy group (A-1100 and A-187, trade names, made by Union Carbide Corporation) and the surface treatment of treating an aluminum chelating compound and then heating to form a layer of aluminum oxide are preferred since the treatment improves the adhesion between the thin layer of the high molecular compound of this invention and the substrate.

When the precursor of this invention is used, a thin film having less defect and having good heat resistance can be formed on a substrate by an LB method and by partially or completely imidating the thin film, the heat resistance thereof can be further improved.

There is no particular restriction on the imidation but it is preferred to perform the imidation with the chemical curing agent, which is used for curing the polyamic acid, such as acetic anhydride, pyridine, etc.

As the matter of course, the imidation method may be simultaneously conducted with a chemical curring and heating or light irradiation.

In the imidation, the following reaction occurs;

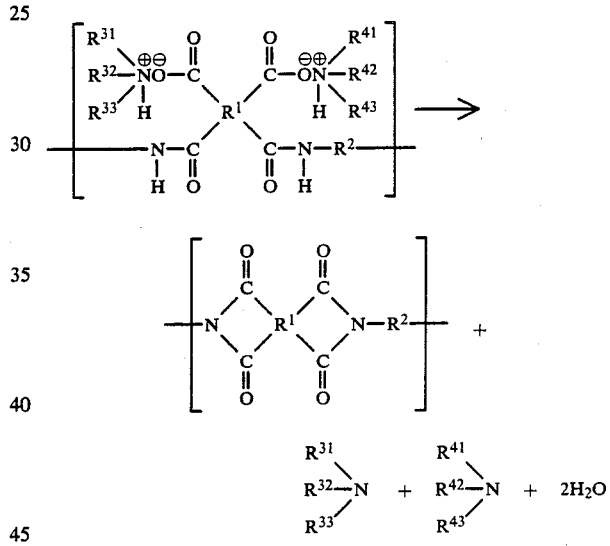

The copolymerized polyamic acid salts of this invention shown by formulae (102), (103), (104), and (105) described above can cause the following ring closings:

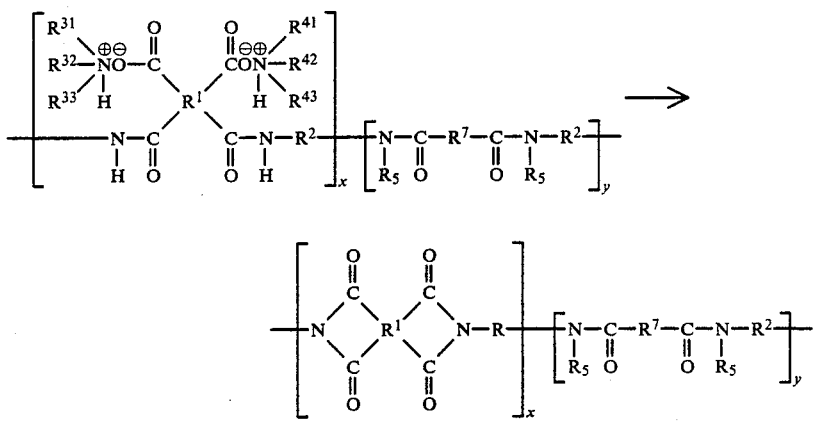

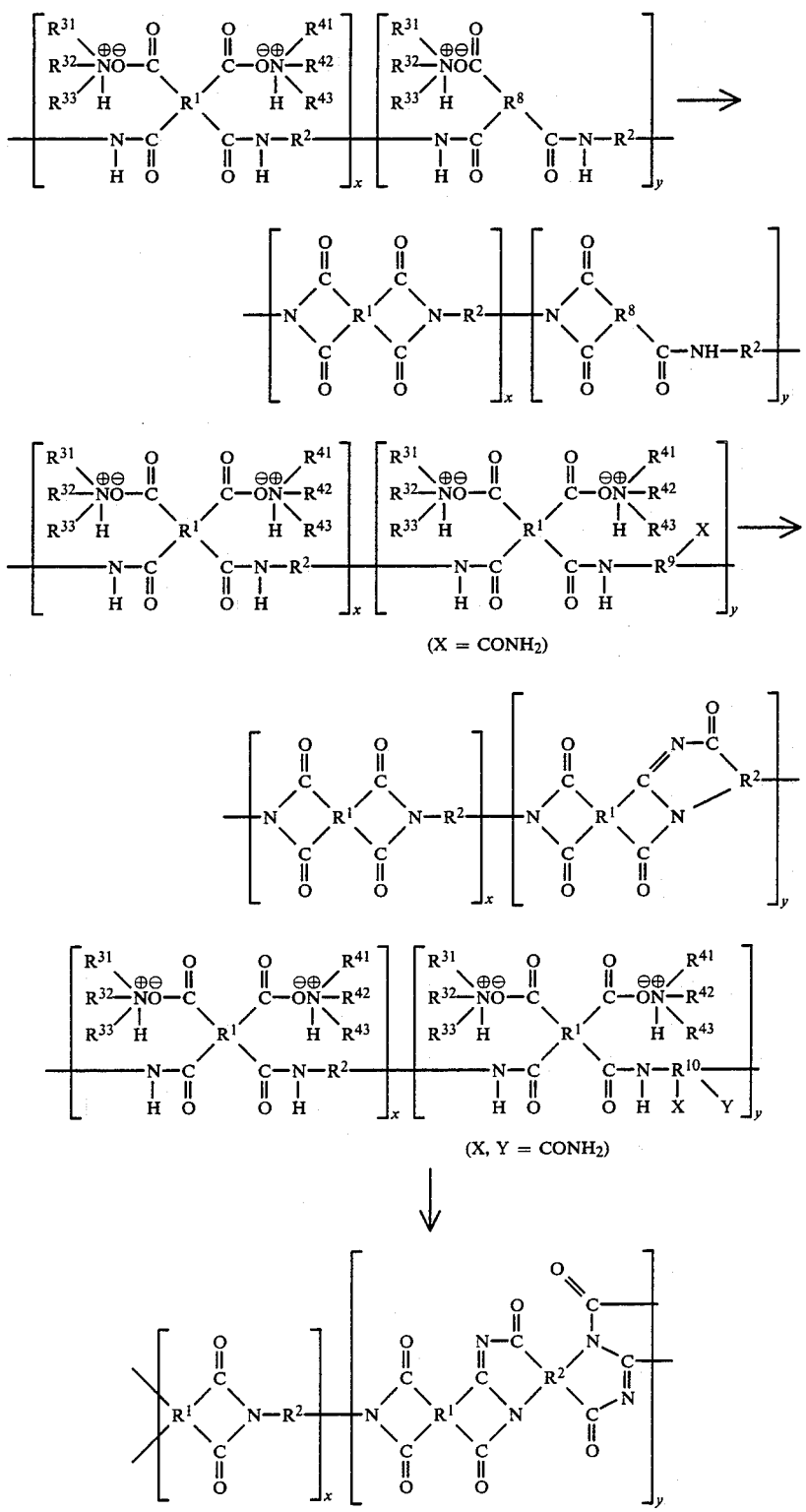
In particular, the later two examples are preferred for the improvement of heat resistance since a skeleton having high heat resistance is introduced.
As a matter of course, the polyamic acid unit shown by formula (8)' below causes a polyimide compound by forming H₂O but in this case, it cannot be a material for forming LB film.

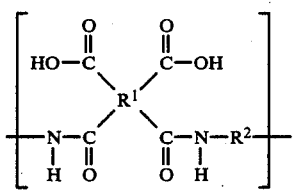

(8)'

When the aforesaid imidation or other ring closing reaction occurs, the group introduced for imparting hydrophobic property is released but when the compound is chemically cured by acetic anhydride, pyridine, etc., under the reaction condition for imidation, the released group is soluble in benzene, etc., used as a solvent and hence a polyimide thin film having a very high heat resistance and good electric insulating property can be obtained.

The polyimide thin film thus obtained is excellent in heat resistance and chemical resistance and has good mechanical properties, and also is a very thin film of less than 10,000 Å. If desired, the thickness of the film can be reduced to from 10 to 1,000 Å. Accordingly, the thin film in this invention can be used not only as insulating film for IC and LSI but also as an insulating layer in electric or electronic elements having a structure of capacitor, MIS, MIM, etc., in the field of electronics. Also, the thin film can be used for field effect transistors, photoelectric converters, photosensitive elements, light emitting elements, photodetectors, hot electron transisters, etc., and also the application for JJ (Josephson junction). Moreover, the thin film can be utilized as clad material for wave guide, optical circuit components, etc., and also can be suitably used as coating materials including protective layers, etc. Still further, the thin film can be also used in the field of energy conversion and material separation.

Then, the invention is explained on the copolymerized polyamic acid salts and the production processes thereof based on the examples.

EXAMPLE 1

In 50 ml of dry dimethylacetamide was dissolved 2.18 g (0.01 mol) of pyromellitic acid dianhydride in a flask, 2 g (0.01 mol) of diaminodiphenyl ether dissolved in 30 ml of dimethylacetamide was added dropwise to the solution at about 20° C. under dry nitrogen gas stream over a period of about 10 minutes, and thereafter, the reaction was performed for 2 hours. The reaction mixture was diluted with a mixed solvent of dimethylacetamide and benzene (1:1) to form a solution of $1 \times 10^{-3}$M and the solution was mixed with a solution of N-n-hexadecyldimethylamine and N-n-octadecyldimethylamine of 1:1 by mol ratio in a mixed solvent of dimethylacetamide and benzene (1:1) so that the sum of these components became $2 \times 10^{-3}$M to provide a solution of a copolymerized polyamic acid salt, which was used as a spreading solution for LB film.

When the surface pressure-area curve of the salt of this example was measured on the surface of distilled water at 20° C., the surface pressure raised at about 150 Å$^2$ in the area per recurring unit and a condensed film was formed. The limiting area was about 140 Å$^2$. When the film on the surface of water was built-up on an aluminum-vapor deposited glass substrate, A z-type built-up film was formed. By the FTIR-ATR analysis of the built-up film, absorptions characteristics to an alkyl group of 3,000 to 2.800 cm$^{-1}$ and carboxylate of 1,650 to 1,600 cm$^{-1}$ were observed.

When the built-up film was chemically cured with acetic anhydride, the absorptions of the alkyl group and the carboxylate vanished and an absorptions of imide bonds of 1780 cm$^{-1}$ and 1720 cm$^{-1}$ appeared, which clearly showed the occurence of imidation reaction in the built-up film.

EXAMPLE 2

After dissolving 1.09 g (0.005 mol) of pyromellitic acid dianhydride and 1.47 g (0.005 mol) of 3,4,4',4'-biphenyltetracarboxylic acid dianhydride in 50 ml of dry dimethylacetamide in a flask, 2 g (0.01 mol) of diaminodiphenyl ether dissolved in 30 ml of dimethylacetamide was added dropwise to the solution at about 20° C. under dry nitrogen gas stream over a period of about 10 minutes and thereafter, the reaction was conducted for 2 hours. The reaction mixture was diluted with a mixed solvent of dimethylacetamide and benzene (1:1) to provide a solution of $1 \times 10^{-3}$M and the solution was mixed with a solution of N-n-octadecyldimethylamine in a mixtures solvent of dimethylacetamide and benzene (1:1) so that the content of N-n-octadecyldimethylamine was $2 \times 10^{-3}$M to provide a solution of a copolymerized polyamic acid salt, which was used as a spreading solution for LB film.

When the surface pressure-area of the salt in this example was measured on the surface of distilled water at 20° C., the surface pressure raised at about 160 Å$^2$ in an area per recurring unit and a condensed film was formed. The limiting area thereof was about 150 Å$^2$. When the film on the surface of water was built-up on an aluminum-vapor deposited glass substrate, Z-type built-up film was formed. By the FTIR-STR analysis of the built-up film, absorptions characteristics to an alkyl group of 3,000 to 2,800 cm$^{-1}$ and the carboxylate of 1,650 cm$^{-1}$ were observed.

When the built-up film was chemically cured with acetic anhydride, the absorptions of the alkyl group and the carboxylate vanished and absorptions of imide bonds of 1,780 cm$^{-1}$ and 1,720 cm$^{-1}$ appeared, which showed the occurence of an imidation reaction in the built-up film.

EXAMPLE 3

After dissolving 2.18 g (0.01 mol) of pyromellitic acid dianhydride in 50 ml of desiccated dimethylacetamide in a flask, 1 g (0.005 mol) of diaminodiphenyl ether and 0.54 g (0.005 mol) of p-diaminobenzene were added dropwise to the solution at about 20° C. under dry nitrogen gas stream over a period of about 10 minutes, and thereafter, the reaction was conducted for 2 hours. The reaction mixture was diluted with a mixed solvent of dimethylacetamide and benzene (1:1) so that the content of N-n-octadecyldimethylamine became $2 \times 10^{-3}$M to provide a solution of a copolymerized polyamic acid salt, which was used as a solution for spreading LB film.

When the surface pressure-area curve of the salt of this invention was measured on the surface of distilled water at 20° C., the surface pressure raised at about 140 Å$^2$ in area per recuring unit and a condensed film was formed. When the film on the surface of water was built-up on an aluminum vapor deposited substrate by an LB method, a Z-type built-up film was formed. By the FTIR-ATR analysis of the built-up film, absorptions characteristics to an alkyl group of 3,000 to 2,800 cm$^{-1}$ and the carboxylate of 1,650 to 1,600 cm$^{-1}$ were observed.

When the built-up film was chemically cured with acetic anhydride, the absorptions of the alkyl group and the carboxylate vanished and absorptions of imide bonds, at 1,780 cm$^{-1}$ and 1,720 cm$^{-1}$ appeared, which clearly showed the occurrence of the imdiation reaction in the build-up film.

As described above, by using the copolymerized polyamic acid salt of this invention, a thin film can be formed by an LB method and by imidating the LB film formed, a very thin film of less than 10,000 Å, if necessary of 10 to 1,000 Å having very excellent heat resistance and electric properties and having good chemical resistance and mechanical properties was obtained. Furthermore, by the copolymerization process of this invention, a polyimide thin film having wide property range can be designed and such a film can be easily obtained.

EXAMPLE 4

After dissolving 1.526 g (0.007 mol) of pyromellitic acid dianhydride and 0.498 g (0.003 mol) of terephthalic acid in 50 ml of dry dimethylacetamide in a flask, 0.72 g of thionyl chloride was added dropwise to the solution at about 0° C. under a dry nitrogen gas stream and the mixture was kept at the state for one hour to perform acylation.

A solution of 2 g (0.01 mol) of diaminodiphenyl ether dissolved in 30 ml of dry dimethylacetamide was added dropwise to the reaction mixture at about 0° C. and thereafter, the reaction was performed for 2 hours at about 20° C. The reaction mixture was diluted with dimethylacetamide and benzene (1:1) to form a solution of 1×10$^{-3}$M, the solution was mixed with a solution of M-n-octadecyldimethylamine in a mixed solvent of dimethylacetamide and benzene (1:1) formed so that the content of the dimethylamine became 2×10$^{-3}$M to cause reaction, the mixture was used for LB film.

When the copolymerized polyamic acid salt obtained in this example was measured on the surface of distilled water at 20° C., the surface pressure raised at about 150 Å$^2$ in area per recurring unit and a condensed film formed. The limiting area was about 140 Å$^2$. When the film on water was built-up on an aluminum vapor deposited glass substrate, a Z-type built-up film was formed. By the FTIR-ATR analysis of the built-up film, the absorptions characteristics for alkyl group of 3000 to 2800 cm$^{-1}$ and carboxylate of 1650 to 1600 cm$^{-1}$ were observed and when the film was chemically cured by pyridine or acetic anhydride, the absorptions of alkyl group and carboxylate vanished and the absorptions of imide bond of 1780 and 1720 cm$^{-1}$ appeared.

EXAMPLE 5

After dissolving 1.526 g (0.007 mol) of pyrromellitic acid dianhydride and 0.576 g (0.003 mol) of trimellitic acid anhydride in 50 ml of dry dimethylacetamide in a flask, 0.36 g of thionyl chloride was added dropwise to the solution at about 0° C. under a dry nitrogen gas stream and the mixture was kept at the state for one hour to perform acylation.

A solution of 2 g (0.01 mol) of diaminodiphenyl ether dissolved in 30 ml of dry dimethylacetamide was added dropwise to the reaction mixture and then the reaction was performed for 2 hours at about 20° C. The reaction mixture was diluted with dimethylacetamide and benzene (1:1) to form a solution of 1×10$^{-3}$M. The solution was mixed with a solution of N-n-octadecyldimethylamine dissolved in a mixed solvent of dimethylacetamide and benzene (1:1) so that the content of the acetamide became 2×10$^{-3}$M to perform the reaction and the reaction mixture was used for LB film as it was.

When the copolymerized polyamic acid salt was also measured on distilled water at 20° C. as in Example 1, the surface pressure raised at about 150 Å$^2$ in area per recurring unit and a condensed film formed. The limiting area was about 140 Å$^2$. When the film on water was built-up on an aluminum vapour deposited glass substrate by an LB method, a Z-type build-up film was formed. By the FTIR-ATR analysis of the build-up film, the absorptions characteristics for alkyl group of 3000 to 2800 cm$^{-1}$ and carboxylate of 1650 to 1600 cm$^{-1}$ were observed. When the film was chemically cured by acetic anhydride or pyridine, the absorptions of the alkyl group and carboxylate vanished and the absorptions of an imide bond of 1780 and 1720 cm$^{-1}$ appeared.

EXAMPLE 6

After dissolving 2.18 g (0.01 mol) of pyromellitic acid dianhydride in 50 ml of dry dimethylacetamide in a flask under dry nitrogen gas stream, a solution of 1.8 g (0.009 mol) of diaminodiphenyl ether and 0.194 g (0.001 mol) of 2,5-diaminoterephthalamide dissolved in 30 ml of dry dimethylacetamide was added dropwise to the solution at about 0° C. and thereafter, the reaction was conducted for 2 hours at about 20° C. The reaction mixture was diluted with dimethylacetamide and benzene (1:1) to form a solution of 1×10$^{-3}$M. The solution was mixed with an equivalent amount of a solution of N-n-octadecyldimethylamine dissolved in dimethylacetiamide and benzene (1:1) so that the content of the dimethylamine became 2×10$^{-3}$M to perform reaction and the product was used for LB film as it was.

When the copolymerized polyamic acid salt was measured on distilled water at 20° C., the surface pressure raised at about 150 Å$^2$ in area per recuring unit and a condensed film formed. The limiting area was about 140 Å$^2$. When the film on water was build-up on an aluminum vapor deposited glass substrate, a Z-type built-up film was formed. By the FTIR-ATR analysis if the built-up film, the absorptions characteristics for alkyl group of 3000 to 2800 cm$^{-1}$ and carboxylate of 1650 to 1600 cm$^{-1}$ were observed. When the film was chemically cured with pyridine or acetic anhydride, the absorptions of alkyl group and carboxylate vanished and absorptions of an imide bond of 1780 and 1720 cm$^{-1}$ appeared.

By using the copolymerized polyamic acid salt of this invention, a thin film can be formed by an LB method and by imidating the LB film formed, a very thin film of less than 10,000 Å, if necessary of 10 to 1,000 Å having very excellent heat resistance and electric properties and having good chemical resistance and mechanical properties was obtained. Furthermore, by the copolymerization process of this invention, a polyimide thin film having wide property range can be designed and such a film can be easily obtained. In particular, when a part of R$^2$ is substituted by a group having trivalent or more, a ring structure having higher heat resistance than imide ring can be formed and the improvement of heat resistance can be expected.

While the invention has been described in detail and with reference to specific embodiment thereof, it will be apparent to one skilled in the art that various changes and modifications can be made therein without departing from the spirit and scope thereof.

What is claimed is:

1. A copolymerized polyamic acid salt having a recurring unit represented by formula $$-(A)_x-(B)_y-\quad (I)$$

wherein (A) represents a formula

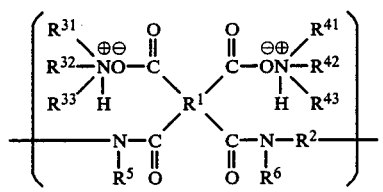

(1)

wherein, $R^1$ represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom;

and (B) represents one or more formula

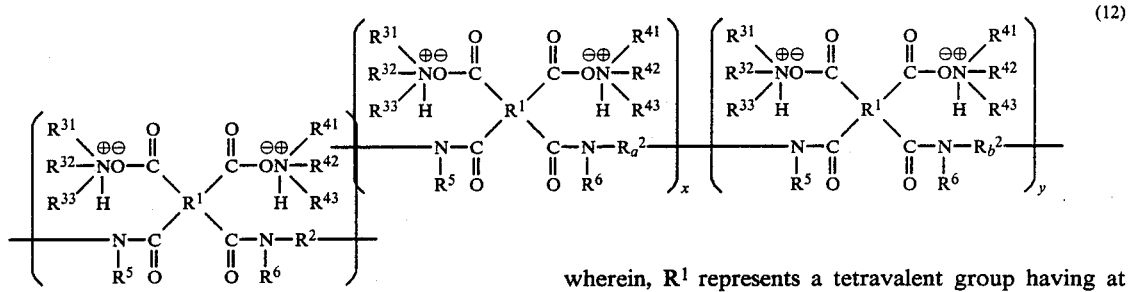

(1)

wherein $R^1$, $R^2$, $R^{31}$, $R^{32}$, $R^{33}$, $R^{41}$, $R^{42}$, $R^{43}$, $R^5$ and $R^6$ are as defined in (A) except that at least one of said $R^1$, $R^2$, $R^{31}$, $R^{32}$, $R^{33}$, $R^{41}$, $R^{42}$, $R^{43}$, $R^5$ and $R^6$ do not take the same group as defined in (A); and x and y represent a ratio which satisfies $0<x<1$, $0<y<1$ and $x+y=1$.

2. The copolymerized polyamic acid salt as claimed in claim 1, wherein $R^{31}$, $R^{32}$, $R^{33}$, $R^{41}$, $R^{42}$, $R^{43}$, $R^5$, and $R^6$ each is the monovalent group having 1 to 22 carbon atoms or a hydrogen atom and at least two of said $R^{31}$, $R^{32}$, $R^{33}$, $R^{41}$, $R^{42}$, $R^{43}$, $R^5$, and $R^6$ do not take a group having 1 to 15 carbon atoms or a hydrogen atom.

3. The copolymerized polyamic acid salt as claimed in claim 1, wherein at least one of $R^1$ and $R^2$ represents a benzenoid unsaturation having at least 6 carbon atoms.

4. The copolymerized polyamic acid salt as claimed in claim 1, wherein each two of four groups of

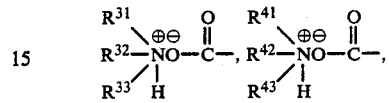

—$NR^5$—CO—, and —CO—$NR^6$—$R^2$— bonded to $R^1$ are bonded to adjoining two carbon atoms constituting $R^1$ to form a 5-membered ring.

5. The polymerized polyamic acid salt as claimed in claim 1, wherein

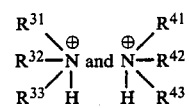

are selected to have a different structure.

6. The polymerized polyamic acid salt as claimed in claim 1, wherein the recurring unit is represented by formula

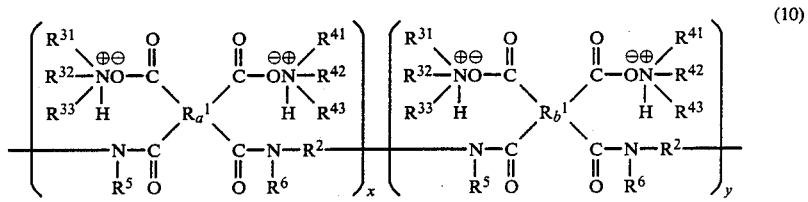

(10)

wherein, $R_a^1$ and $R_b^1$ each represents a tetravalent group having at least 2 carbon atoms; $R^2$ represents a divalent group having at least 2 carbon atoms; $R^{31}$, $R^{32}$, $R^{33}$, $R^{41}$, $R^{42}$, $R^{43}$, $R^5$, $R^6$, x and y are as defined above.

7. The copolymerized polyamic acid salt as claimed in claim 1, wherein the recurring unit is represented by formula (12)

wherein, $R^1$ represents a tetravalent group having at least 2 carbon atoms; $R_a^2$ and $R_b^2$ each represents a divalent group having at least 2 carbon atoms; $R^{31}$, $R^{32}$, $R^{33}$, $R^{41}$, $R^{42}$, $R^{43}$, $R^5$, $R^6$, x and y are as defined above.

8. The copolymerized polyamic acid salt as claimed in claim 1, $R^5$ and $R^6$ in formula (1) are a hydrogen atom.

9. A copolymerized polyamic acid salt having a recurring unit represented by formula

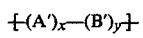  (II)

wherein (A') represents a formula

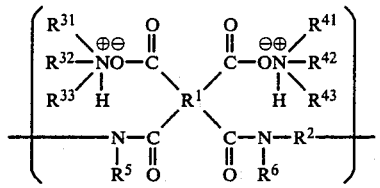  (1)

wherein, $R^1$ represents a tetravalent group having at least 2 carbon atoms; $R^2$ represents a divalent group having at least 2 carbon atoms; and $R^{31}$, $R^{32}$, $R^{33}$, $R^{41}$, $R^{42}$, $R^{43}$, $R^5$, and $R^6$ each represents a monovalent group having 1 to 30 carbon atoms selected from an aliphatic group, an alicyclic group, an aromatic group, a group in which an aliphatic group is combined with an alicyclic group or an aromatic group, each of these groups substituted by a halogen atom, a nitro group, an amino group, a cyano group, a methoxy group, or an acetoxy group, or a hydrogen atom; at least one of said $R^{31}$, $R^{32}$, $R^{33}$, $R^{41}$, $R^{42}$, $R^{43}$, $R^5$ and $R^6$ do not take a group having 1 to 11 carbon atoms or a hydrogen atom; and (B') represents one or more formula

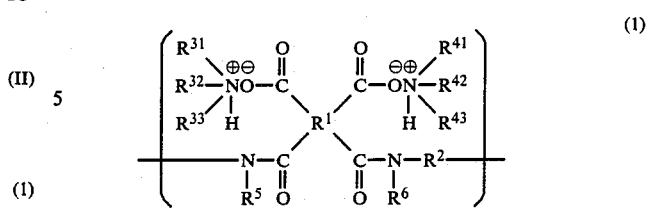  (1)

wherein $R^1$, $R^2$, $R^{31}$, $R^{32}$, $R^{33}$, $R^{41}$, $R^{42}$, $R^{43}$, $R^5$ and $R^6$ are as defined in (A); a part of at least one of $R^1$ and $R^2$ is substituted by a group having a different valence; x and y represent a ratio which satisfies $0<x<1$, $0<y<1$ and $x+y=1$.

10. The copolymerized polyamic acid salt as claimed in claim 9, wherein the recurring unit of formula (1) in which a part of $R^1$ is substituted by a divalent group $R^7$ having at least 2 carbon atoms is represented by formula

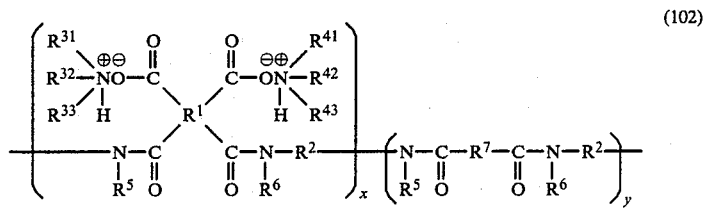  (102)

wherein, $R^1$, $R^2$, $R^{31}$, $R^{32}$, $R^{33}$, $R^{41}$, $R^{42}$, $R^{43}$, $R^5$, $R^6$, x and y are as defined in claim 9; and $R^7$ represents a divalent group having at least 2 carbon atoms.

11. The copolymerized polymaric acid salt as claimed in claim 9, wherein the recurring unit of formula (1) in which a part of $R^1$ is substituted by a trivalent group $R^8$ having at least 2 carbon atoms is represented by formula

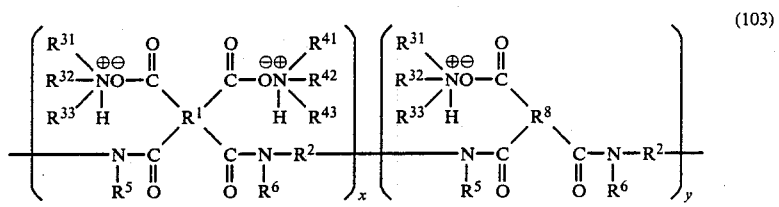  (103)

wherein, $R^1$, $R^2$, $R^{31}$, $R^{32}$, $R^{33}$, $R^{41}$, $R^{42}$, $R^{43}$, $R^5$, $R^6$, x and y are as defined in claim 9, and $R^8$ represents a trivalent group having at least 2 carbon atoms.

12. The copolymerized polyamic acid salt as claimed in claim 9, wherein the recurring unit of formula (1) in which a part of $R^2$ is substituted by a trivalent group $R^9$ having at least 2 carbon atoms is represented by formula

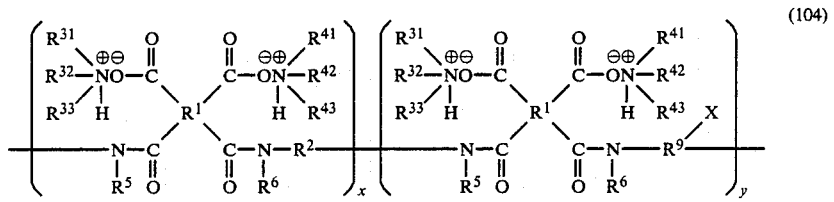  (104)

wherein, $R^1$, $R^2$, $R^{31}$, $R^{32}$, $R^{33}$, $R^{41}$, $R^{42}$, $R^{43}$, $R^5$, $R^6$, x and y are as defined in claim 9; and $R^9$ represents a trivalent group having at least 2 carbon atoms.

13. The copolymerized polyamic acid salt as claimed in claim 9, wherein the recurring unit of formula (1) in which a part of $R^2$ is substituted by a tetravalent group $R^{10}$ having at least 2 carbon atoms is represented by formula

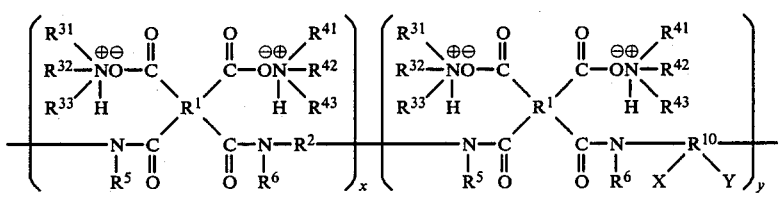

(105)

wherein, $R^1$, $R^2$, $R^{31}$, $R^{32}$, $R^{33}$, $R^{41}$, $R^{42}$, $R^{43}$, $R^5$, $R^6$, x and y are as defined in claim 9; and $R^{10}$ represents a tetravalent group having at least 2 carbon atoms.

14. The copolymerized polyamic acid salt as claimed in claim 9, wherein said $R^{31}$, $R^{32}$, $R^{33}$, $R^{41}$, $R^{42}$, $R^{43}$, $R^5$, and $R^6$ each is monovalent group having 1 to 22 carbon atoms or hydrogen atom and at least two of said $R^{31}$, $R^{32}$, $R^{33}$, $R^{41}$, $R^{42}$, $R^{43}$, $R^5$, and $R^6$ do not take a group having 1 to 15 carbon atoms or a hydrogen atom.

15. The copolymerized polyamic acid salt as claimed in claim 9, wherein at least one of $R^1$ and $R^2$ in formula (1) is a group of a benzenoid unsaturation having at least 6 carbon atoms.

16. The copolymerized polyamic acid salt as claimed in claim 9, wherein each two of four groups,

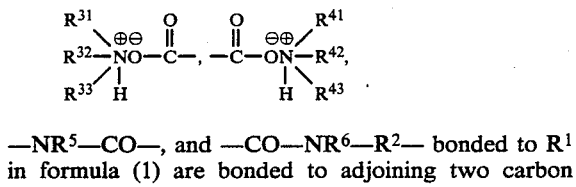

—$NR^5$—CO—, and —CO—$NR^6$—$R^2$— bonded to $R^1$ in formula (1) are bonded to adjoining two carbon atoms constituting $R^1$ to form a 5-membered ring or a 6-membered ring.

17. The copolymerized polyamic acid salt as claimed in claim 11, wherein two of three groups

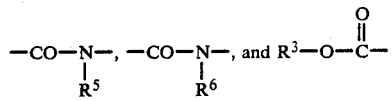

bonded to $R^8$ are bonded to adjoining two carbon atoms constituting $R^8$ to form a 5-membered ring or a 6-membered ring.

18. The copolymerized polyamic acid salt as claimed in claim 12, wherein two of three groups

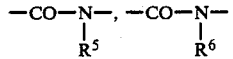

and X bonded to $R^9$ in formula (104) are bonded to adjoining two carbon atoms constituting $R^9$ to form a 5-membered ring or a 6-membered ring.

19. The copolymerized polyamic acid salt as claimed in claim 13, wherein two of four groups

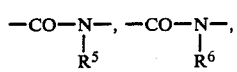

X, and Y bonded to $R^{10}$ in formula (105) are bonded to adjoining two carbon atoms constituting $R^{10}$ to form a 5-membered ring or a 6-membered ring.

20. The polymerized polyamic acid salt as claimed in claim 10, wherein the recurring unit is represented by formula

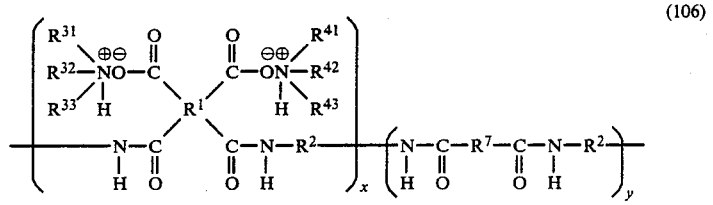

(106)

wherein, $R^1$, $R^2$, $R^{31}$, $R^{32}$, $R^{33}$, $R^{41}$, $R^{42}$, $R^{43}$, x and y are as defined in claim 9; provided that one of said $R^{31}$, $R^{32}$, and $R^{33}$ and one of said $R^{41}$, $R^{42}$, and $R^{43}$ do not take a group having 1 to 11 carbon atoms or a hydrogen atom; $R^7$ represents a divalent group having at least 2 carbon atoms.

21. The polymerized polyamic acid salt as claimed in claim 11, wherein the recurring unit is represented by formula

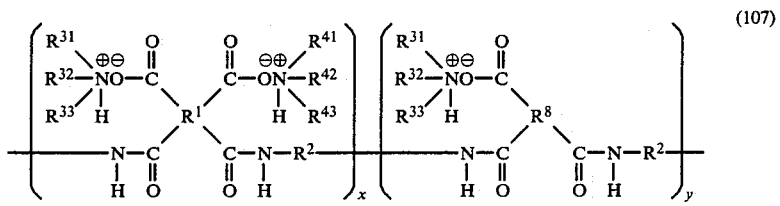

(107)

wherein, $R^1$, $R^2$, $R^{31}$, $R^{32}$, $R^{33}$, $R^{41}$, $R^{42}$, $R^{43}$, x and y are as defined in claim 9, provided that one of said $R^{31}$, $R^{32}$, and $R^{33}$ and one of said $R^{41}$, $R^{42}$, and $R^{43}$ do not take a group having 1 to 11 carbon atoms or a hydrogen atom; $R^8$ represents a trivalent group having at least 2 carbon atoms.

22. The polymerized polyamic acid salt as claimed in claim 12, wherein the recurring unit is represented by formula

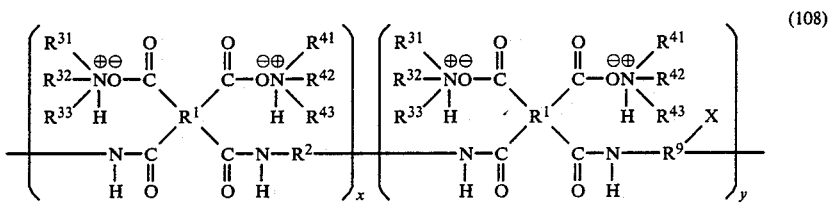

(108)

wherein, $R^1$, $R^2$, $R^{31}$, $R^{32}$, $R^{33}$, $R^{41}$, $R^{42}$, $R^{43}$, x and y are as defined in claim 9, one of said $R^{31}$, $R^{32}$, and $R^{33}$ and one of said $R^{41}$, $R^{42}$, and $R^{43}$ do not take a group having 1 to 11 carbon atoms or a hydrogen atom; $R^9$ represents a trivalent group having at least 2 carbon atoms and X represents a substituent for $R^9$.

23. The polymerized polyamic acid salt as claimed in claim 13, wherein the recurring unit is represented by formula

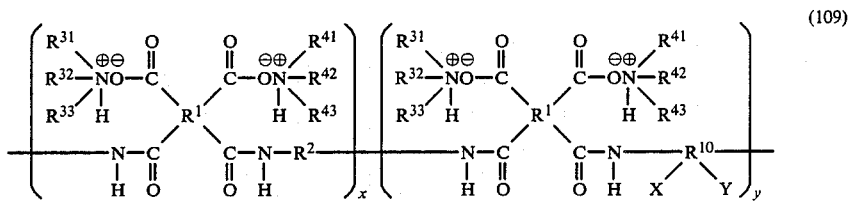

(109)

wherein, $R^1$, $R^2$, $R^{31}$, $R^{32}$, $R^{33}$, $R^{41}$, $R^{42}$, $R^{43}$, x and y are as defined in claim 9, one of said $R^{31}$, $R^{32}$, and $R^{33}$ and one of said $R^{41}$, $R^{42}$, and $R^{43}$ do not take a group having 1 to 11 carbon atoms or a hydrogen atom; and $R^{10}$ represents a trivalent group having 1 to 11 carbon atoms.

* * * * *

UNITED STATES PATENT AND TRADEMARK OFFICE
CERTIFICATE OF CORRECTION

PATENT NO. : 4,954,608

DATED : September 4, 1990

INVENTOR(S) : Masakazu UEKITA et al.

It is certified that error appears in the above-identified patent and that said Letters Patent is hereby corrected as shown below:

On the cover page, Item [73], after "Kabushiki" insert --Kaisha--.

In the Abstract, delete "0 x 1, 0 y 1 and x+y=1" and substitute therefor --0<x<1, 0<y<1--.

Columns 4, 5, 6, 8, 9, 11, 12, 38, 44, 45, 46, 48, 50, 52 and 72 (Formula 4) delete "

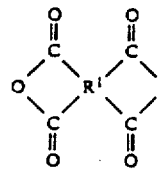

(4)

"

and substitute therefor -- 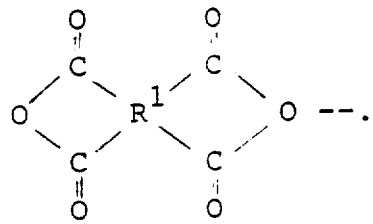 --.

UNITED STATES PATENT AND TRADEMARK OFFICE
CERTIFICATE OF CORRECTION

PATENT NO. : 4,954,608
DATED : September 4, 1990
INVENTOR(S) : Masakazu UEKITA et al.

It is certified that error appears in the above-identified patent and that said Letters Patent is hereby corrected as shown below:

Column 22, line 43, "$0<x<0$" should read --$0<x<1$--.

Column 43, line 5, delete "

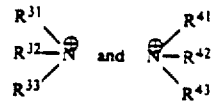

"

and substitute therefor --

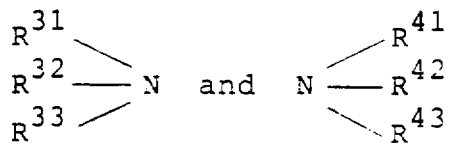

--;

line 53, delete "H" at the end of line;
line 54, delete "$(CF_2)_4(CH_2)_{13}N(CH_3)_2$" should read --$H(CF_2)_4(CH_2)_{13}N(CH_3)_2$--.

UNITED STATES PATENT AND TRADEMARK OFFICE
CERTIFICATE OF CORRECTION

PATENT NO. : 4,954,608
DATED : September 4, 1990
INVENTOR(S) : Masakazu UEKITA et al.

It is certified that error appears in the above-identified patent and that said Letters Patent is hereby corrected as shown below:

Column 48, line 25, delete "
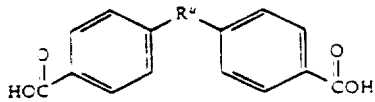
"

and substitute therefor --
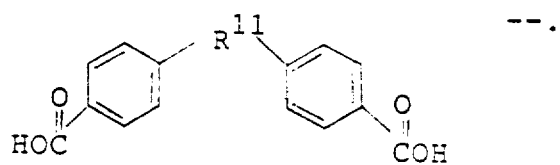
--.

Column 58, fourth formula at right hand, delete "
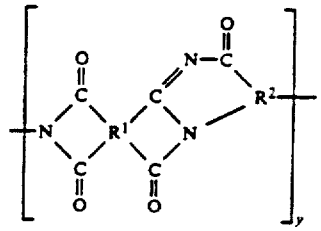
"

and substitute therefor --
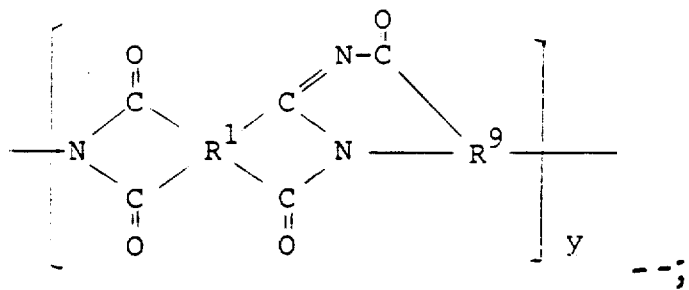
--;

UNITED STATES PATENT AND TRADEMARK OFFICE
CERTIFICATE OF CORRECTION

PATENT NO. : 4,954,608

DATED : September 4, 1990

INVENTOR(S) : Masakazu UEKITA et al.

It is certified that error appears in the above-identified patent and that said Letters Patent is hereby corrected as shown below:

Column 58, sixth formula at right hand, delete "

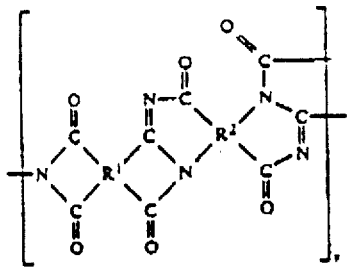

"

UNITED STATES PATENT AND TRADEMARK OFFICE
CERTIFICATE OF CORRECTION

PATENT NO. : 4,954,608

DATED : September 4, 1990

INVENTOR(S) : Masakazu UEKITA et al.

It is certified that error appears in the above-identified patent and that said Letters Patent is hereby corrected as shown below:

and substitute therefor --

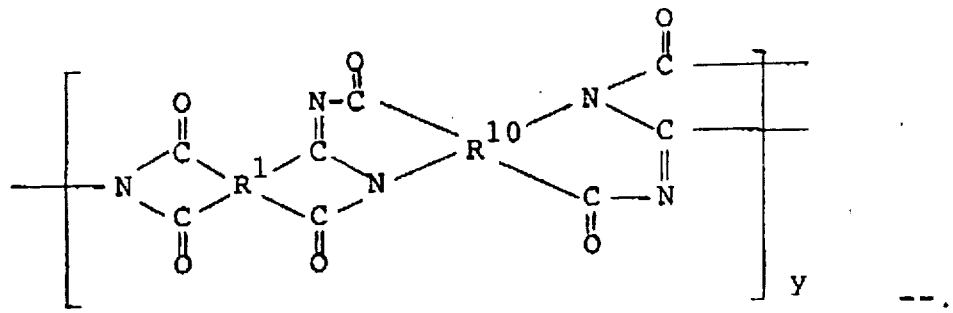

--.

Signed and Sealed this

Eleventh Day of June, 1991

*Attest:*

HARRY F. MANBECK, JR.

*Attesting Officer*      *Commissioner of Patents and Trademarks*